US012801221B2

(12) United States Patent
Tsoi et al.

(10) Patent No.: US 12,801,221 B2
(45) Date of Patent: Nov. 17, 2026

(54) TECHNIQUES FOR CONTROLLING DEVICES

(71) Applicant: Apple Inc., Cupertino, CA (US)

(72) Inventors: Peter C. Tsoi, San Mateo, CA (US); Adam S. Meyer, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 63 days.

(21) Appl. No.: 18/799,489

(22) Filed: Aug. 9, 2024

(65) Prior Publication Data

US 2025/0110565 A1 Apr. 3, 2025

Related U.S. Application Data

(60) Provisional application No. 63/587,103, filed on Sep. 30, 2023, provisional application No. 63/541,841, filed on Sep. 30, 2023.

(51) Int. Cl.
*G06F 3/01* (2006.01)

(52) U.S. Cl.
CPC .................................... *G06F 3/017* (2013.01)

(58) Field of Classification Search
None
See application file for complete search history.

(56) References Cited

U.S. PATENT DOCUMENTS 8,452,600 B2 * 5/2013 Fleizach ................. G10L 13/00 704/260
9,294,819 B2 * 3/2016 Lee .................... H04N 21/4622
9,619,019 B2 * 4/2017 Phang ................. G06F 3/04815
9,804,733 B2 10/2017 Walline et al.
10,489,459 B1 11/2019 Jastrzebski et al.
10,997,963 B1 5/2021 Baligar et al.
11,934,569 B2 3/2024 Pastrana Vicente et al.
2009/0123046 A1 5/2009 Mielekamp et al.
2011/0197147 A1 8/2011 Fai
2012/0293519 A1 11/2012 Ribble et al.
2013/0019178 A1 * 1/2013 Morikawa ............... G06F 3/017 715/731
2013/0159939 A1 6/2013 Krishnamurthi
2013/0162530 A1 * 6/2013 Takahashi ............... G06F 3/017 345/157
2014/0079247 A1 3/2014 Sanders
2014/0136518 A1 * 5/2014 Shum .................. G06F 16/9038 707/E17.014
2014/0267103 A1 * 9/2014 Chaudhri ............ G06F 3/04847 345/173
(Continued)

FOREIGN PATENT DOCUMENTS

AU 2021239971 A1 9/2022
CN 117873325 A 4/2024
(Continued)

OTHER PUBLICATIONS

International Patent Application No. PCT/US2024/029855; Int'l Search Report and the Written Opinion; dated Sep. 18, 2024; 13 pages.
(Continued)

*Primary Examiner* — Parul H Gupta
(74) *Attorney, Agent, or Firm* — Kyle B. Morse; BAKERHOSTETLER

(57) ABSTRACT

The present disclosure generally relates to controlling devices using gestures.

23 Claims, 11 Drawing Sheets

(56) References Cited

U.S. PATENT DOCUMENTS

| | | | | |
|---|---|---|---|---|
| 2014/0359651 | A1* | 12/2014 | Lee | H04N 21/472 725/25 |
| 2015/0131855 | A1 | 5/2015 | Hanzawa et al. | |
| 2015/0254905 | A1 | 9/2015 | Ramsby et al. | |
| 2015/0378462 | A1* | 12/2015 | Chakirov | G06F 3/0416 715/720 |
| 2017/0150139 | A1 | 5/2017 | Lee et al. | |
| 2018/0046352 | A1 | 2/2018 | Johnson et al. | |
| 2018/0081447 | A1 | 3/2018 | Gummadi et al. | |
| 2018/0284872 | A1 | 10/2018 | Schluessler et al. | |
| 2018/0330515 | A1 | 11/2018 | Stall et al. | |
| 2019/0197785 | A1 | 6/2019 | Tate-Gans et al. | |
| 2019/0247130 | A1 | 8/2019 | State et al. | |
| 2019/0342425 | A1 | 11/2019 | Cheng et al. | |
| 2020/0082493 | A1 | 3/2020 | Wang et al. | |
| 2020/0320794 | A1 | 10/2020 | Huang et al. | |
| 2021/0041956 | A1* | 2/2021 | Hasburgh | G06F 3/017 |
| 2021/0089132 | A1* | 3/2021 | Mathur | G06F 3/017 |
| 2022/0137713 | A1* | 5/2022 | Hu | G06F 3/04847 715/722 |
| 2022/0214857 | A1 | 7/2022 | Lambourne et al. | |
| 2022/0229534 | A1 | 7/2022 | Terre et al. | |
| 2022/0253139 | A1 | 8/2022 | Berliner et al. | |
| 2023/0074380 | A1* | 3/2023 | Kim | G06F 3/017 |
| 2023/0094522 | A1 | 3/2023 | Stauber et al. | |
| 2023/0100689 | A1* | 3/2023 | Chiu | G06F 3/017 345/157 |
| 2023/0146384 | A1 | 5/2023 | Terre et al. | |
| 2023/0152935 | A1 | 5/2023 | McKenzie et al. | |
| 2023/0165639 | A1 | 6/2023 | Dulin et al. | |
| 2023/0315247 | A1 | 10/2023 | Pastrana Vicente et al. | |
| 2025/0271856 | A1* | 8/2025 | Von Volkmann | G06F 3/0485 |
| 2025/0301556 | A1* | 9/2025 | Mouilleseaux | G06T 13/00 |

FOREIGN PATENT DOCUMENTS

| | | | |
|---|---|---|---|
| EP | 3265883 | B1 | 2/2023 |
| WO | WO 2022/055822 | A1 | 3/2022 |
| WO | WO 2023/014618 | A1 | 2/2023 |

OTHER PUBLICATIONS

International Patent Application No. PCT/US2024/030462; Int'l Search Report and the Written Opinion; dated Sep. 30, 2024; 21 pages.

International Patent Application No. PCT/US2024/032394; Invitation to Pay Add'l Fees; dated Sep. 25, 2024; 20 pages.

International Patent Application No. PCT/US2024/032401; Int'l Search Report and the Written Opinion; dated Oct. 14, 2024; 16 pages.

International Patent Application No. PCT/US2024/030181; Int'l Search Report and the Written Opinion; dated Oct. 31, 2024; 21 pages.

International Patent Application No. PCT/US2024/032394; Int'l Search Report and the Written Opinion; dated Nov. 15, 2024; 23 pages.

International Patent Application No. PCT/US2024/047378; Invitation to Pay Add'l Fees; dated Dec. 20, 2024; 13 pages.

International Patent Application No. PCT/US2024/047378; Int'l Search Report and the Written Opinion; dated Feb. 10, 2025; 22 pages.

European Patent Application No. 25150841.2; Extended Search Report; dated Feb. 18, 2025; 10 pages.

European Patent Application No. 25180843.2; Extended Search Report; dated Jul. 14, 2025; 11 pages.

International Patent Application No. PCT/US2024/032401; Invitation to Pay Add'l Fees; Aug. 23, 2024; 17 pages.

"2GIG Edge™ Security & Smart Home System—User Guide"; https://2gig.com/wp-content/uploads/10029908-Rev-A-2GIG-Edge-User-Guide-0322_WEB.pdf; Nortek Security & Control LLC; © 2021; 60 pages.

"Get Back to Work Safely"; https://www.anviz.com/get-back-to-work-safely.html; Anviz Global Inc.; © 2023; accessed Sep. 10, 2024; 5 pages.

"Top 7 Use Cases for Facial Recognition in 2023"; https://www.cyberlink.com/faceme/insights/articles/228/how-to-use-facial-recognition; FaceMe; Mar. 2023; accessed Sep. 10, 2024; 12 pages.

International Patent Application No. PCT/US2024/030462; Invitation to Pay Add'l Fees; dated Aug. 9, 2024; 14 pages.

International Patent Application No. PCT/US2024/029952; Int'l Search Report and the Written Opinion; dated Sep. 12, 2024; 12 pages.

International Patent Application No. PCT/US2024/030181; Invitation to Pay Additional Fees; dated Sep. 10, 2024; 14 pages.

European Patent Application No. 25180819.2; Extended Search Report; dated Aug. 14, 2025; 10 pages.

U.S. Appl. No. 18/619,568; Non-Final Office Action; dated Nov. 28, 2025; 19 pages.

Huynh et al.; "Layerable Apps: Comparing Concurrent and Exclusive Display of Augmented Reality Applications"; IEEE Int'l Symposium on Mixed and Augmented Reality; 2022; p. 857-863.

* cited by examiner

TECHNIQUES FOR CONTROLLING DEVICES

CROSS-REFERENCE TO RELATED APPLICATIONS

The present application claims priority to U.S. Provisional Patent Application Ser. No. 63/541,841, entitled "TECHNIQUES FOR CONTROLLING DEVICES," filed Sep. 30, 2023, and to U.S. Provisional Patent Application Ser. No. 63/587,103, entitled "GESTURE DISAMBIGUATION," filed Sep. 30, 2023, which are hereby incorporated by reference in their entireties for all purposes.

BACKGROUND

Electronic devices are sometimes controlled using a gesture. For example, a user can perform a gesture to control an electronic device.

SUMMARY

Some techniques for controlling devices using gestures, however, are generally cumbersome and inefficient. For example, some existing techniques are user agnostic such that the same gesture causes the same operation to be performed no matter who performs the gesture. Existing techniques require more time than necessary, wasting user time and device energy. This latter consideration is particularly important in battery-operated devices.

Accordingly, the present technique provides electronic devices with faster, more efficient methods and interfaces for controlling devices using gestures. Such methods and interfaces optionally complement or replace other methods for controlling devices using gestures. Such methods and interfaces reduce the cognitive burden on a user and produce a more efficient human-machine interface. For battery-operated computing devices, such methods and interfaces conserve power and increase the time between battery charges.

In some embodiments, a method that is performed at a computer system that is in communication with one or more input devices is described. In some embodiments, the method comprises: detecting, via the one or more input devices, a first air gesture; and in response to detecting the first air gesture: in accordance with a determination that the first air gesture was performed by a first user, performing a first operation; and in accordance with a determination that the first air gesture was performed by a second user different from the first user, performing a second operation different from the first operation.

In some embodiments, a non-transitory computer-readable storage medium storing one or more programs configured to be executed by one or more processors of a computer system that is in communication with one or more input devices is described. In some embodiments, the one or more programs includes instructions for: detecting, via the one or more input devices, a first air gesture; and in response to detecting the first air gesture: in accordance with a determination that the first air gesture was performed by a first user, performing a first operation; and in accordance with a determination that the first air gesture was performed by a second user different from the first user, performing a second operation different from the first operation.

In some embodiments, a transitory computer-readable storage medium storing one or more programs configured to be executed by one or more processors of a computer system that is in communication with one or more input devices is described. In some embodiments, the one or more programs includes instructions for: detecting, via the one or more input devices, a first air gesture; and in response to detecting the first air gesture: in accordance with a determination that the first air gesture was performed by a first user, performing a first operation; and in accordance with a determination that the first air gesture was performed by a second user different from the first user, performing a second operation different from the first operation.

In some embodiments, a computer system that is in communication with one or more input devices is described. In some embodiments, the computer system that is in communication with one or more input devices comprises one or more processors and memory storing one or more programs configured to be executed by the one or more processors. In some embodiments, the one or more programs includes instructions for: detecting, via the one or more input devices, a first air gesture; and in response to detecting the first air gesture: in accordance with a determination that the first air gesture was performed by a first user, performing a first operation; and in accordance with a determination that the first air gesture was performed by a second user different from the first user, performing a second operation different from the first operation.

In some embodiments, a computer system that is in communication with one or more input devices is described. In some embodiments, the computer system that is in communication with one or more input devices comprises means for performing each of the following steps: detecting, via the one or more input devices, a first air gesture; and in response to detecting the first air gesture: in accordance with a determination that the first air gesture was performed by a first user, performing a first operation; and in accordance with a determination that the first air gesture was performed by a second user different from the first user, performing a second operation different from the first operation.

In some embodiments, a computer program product is described. In some embodiments, the computer program product comprises one or more programs configured to be executed by one or more processors of a computer system that is in communication with one or more input devices. In some embodiments, the one or more programs include instructions for: detecting, via the one or more input devices, a first air gesture; and in response to detecting the first air gesture: in accordance with a determination that the first air gesture was performed by a first user, performing a first operation; and in accordance with a determination that the first air gesture was performed by a second user different from the first user, performing a second operation different from the first operation.

In some embodiments, a method that is performed at a computer system that is in communication with one or more input devices and one or more output devices is described. In some embodiments, the method comprises: while the computer system is in an inactive mode, detecting, via the one or more input devices, a first air gesture; in response to detecting the first air gesture and while the computer system is in the inactive mode: transitioning the computer system from the inactive mode to an active mode different from the inactive mode; and outputting, via the one or more output devices, a representation of first content; while the computer system is in the active mode and after outputting, via the one or more output devices, a first representation of second content, detecting, via the one or more input devices, the first air gesture; and in response to detecting the first air gesture and while the computer system is in the active mode, outputting, via the one or more output devices, a second representation of the second content, wherein the second representation is different from the first representation.

In some embodiments, a non-transitory computer-readable storage medium storing one or more programs configured to be executed by one or more processors of a computer system that is in communication with one or more input devices and one or more output devices is described. In some embodiments, the one or more programs includes instructions for: while the computer system is in an inactive mode, detecting, via the one or more input devices, a first air gesture; in response to detecting the first air gesture and while the computer system is in the inactive mode: transitioning the computer system from the inactive mode to an active mode different from the inactive mode; and outputting, via the one or more output devices, a representation of first content; while the computer system is in the active mode and after outputting, via the one or more output devices, a first representation of second content, detecting, via the one or more input devices, the first air gesture; and in response to detecting the first air gesture and while the computer system is in the active mode, outputting, via the one or more output devices, a second representation of the second content, wherein the second representation is different from the first representation.

In some embodiments, a transitory computer-readable storage medium storing one or more programs configured to be executed by one or more processors of a computer system that is in communication with one or more input devices and one or more output devices is described. In some embodiments, the one or more programs includes instructions for: while the computer system is in an inactive mode, detecting, via the one or more input devices, a first air gesture; in response to detecting the first air gesture and while the computer system is in the inactive mode: transitioning the computer system from the inactive mode to an active mode different from the inactive mode; and outputting, via the one or more output devices, a representation of first content; while the computer system is in the active mode and after outputting, via the one or more output devices, a first representation of second content, detecting, via the one or more input devices, the first air gesture; and in response to detecting the first air gesture and while the computer system is in the active mode, outputting, via the one or more output devices, a second representation of the second content, wherein the second representation is different from the first representation.

In some embodiments, a computer system that is in communication with one or more input devices and one or more output devices is described. In some embodiments, the computer system that is in communication with one or more input devices and one or more output devices comprises one or more processors and memory storing one or more programs configured to be executed by the one or more processors. In some embodiments, the one or more programs includes instructions for: while the computer system is in an inactive mode, detecting, via the one or more input devices, a first air gesture; in response to detecting the first air gesture and while the computer system is in the inactive mode: transitioning the computer system from the inactive mode to an active mode different from the inactive mode; and outputting, via the one or more output devices, a representation of first content; while the computer system is in the active mode and after outputting, via the one or more output devices, a first representation of second content, detecting, via the one or more input devices, the first air gesture; and in response to detecting the first air gesture and while the computer system is in the active mode, outputting, via the one or more output devices, a second representation of the second content, wherein the second representation is different from the first representation.

In some embodiments, a computer system that is in communication with one or more input devices and one or more output devices is described. In some embodiments, the computer system that is in communication with one or more input devices and one or more output devices comprises means for performing each of the following steps: while the computer system is in an inactive mode, detecting, via the one or more input devices, a first air gesture; in response to detecting the first air gesture and while the computer system is in the inactive mode: transitioning the computer system from the inactive mode to an active mode different from the inactive mode; and outputting, via the one or more output devices, a representation of first content; while the computer system is in the active mode and after outputting, via the one or more output devices, a first representation of second content, detecting, via the one or more input devices, the first air gesture; and in response to detecting the first air gesture and while the computer system is in the active mode, outputting, via the one or more output devices, a second representation of the second content, wherein the second representation is different from the first representation.

In some embodiments, a computer program product is described. In some embodiments, the computer program product comprises one or more programs configured to be executed by one or more processors of a computer system that is in communication with one or more input devices and one or more output devices. In some embodiments, the one or more programs include instructions for: while the computer system is in an inactive mode, detecting, via the one or more input devices, a first air gesture; in response to detecting the first air gesture and while the computer system is in the inactive mode: transitioning the computer system from the inactive mode to an active mode different from the inactive mode; and outputting, via the one or more output devices, a representation of first content; while the computer system is in the active mode and after outputting, via the one or more output devices, a first representation of second content, detecting, via the one or more input devices, the first air gesture; and in response to detecting the first air gesture and while the computer system is in the active mode, outputting, via the one or more output devices, a second representation of the second content, wherein the second representation is different from the first representation.

In some embodiments, a method that is performed at a computer system that is in communication with one or more input devices and one or more output devices is described. In some embodiments, the method comprises: while outputting, via the one or more output devices, content, detecting, via the one or more input devices, a first air gesture; and in response to detecting the first air gesture: in accordance with a determination that the first air gesture is a first type of moving air gesture, performing, based on movement of the first air gesture, a first operation while continuing to output the content; and in accordance with a determination that the first air gesture is a second type of moving air gesture different from the first type of moving air gesture, performing, based on the movement of the first air gesture, a second operation, different from the first operation, while no longer outputting, via the one or more output devices, the content.

In some embodiments, a non-transitory computer-readable storage medium storing one or more programs configured to be executed by one or more processors of a computer system that is in communication with one or more input devices and one or more output devices is described. In some embodiments, the one or more programs includes instructions for: while outputting, via the one or more output devices, content, detecting, via the one or more input devices, a first air gesture; and in response to detecting the first air gesture: in accordance with a determination that the first air gesture is a first type of moving air gesture, performing, based on movement of the first air gesture, a first operation while continuing to output the content; and in accordance with a determination that the first air gesture is a second type of moving air gesture different from the first type of moving air gesture, performing, based on the movement of the first air gesture, a second operation, different from the first operation, while no longer outputting, via the one or more output devices, the content.

In some embodiments, a transitory computer-readable storage medium storing one or more programs configured to be executed by one or more processors of a computer system that is in communication with one or more input devices and one or more output devices is described. In some embodiments, the one or more programs includes instructions for: while outputting, via the one or more output devices, content, detecting, via the one or more input devices, a first air gesture; and in response to detecting the first air gesture: in accordance with a determination that the first air gesture is a first type of moving air gesture, performing, based on movement of the first air gesture, a first operation while continuing to output the content; and in accordance with a determination that the first air gesture is a second type of moving air gesture different from the first type of moving air gesture, performing, based on the movement of the first air gesture, a second operation, different from the first operation, while no longer outputting, via the one or more output devices, the content.

In some embodiments, a computer system that is in communication with one or more input devices and one or more output devices is described. In some embodiments, the computer system that is in communication with one or more input devices and one or more output devices comprises one or more processors and memory storing one or more programs configured to be executed by the one or more processors. In some embodiments, the one or more programs includes instructions for: while outputting, via the one or more output devices, content, detecting, via the one or more input devices, a first air gesture; and in response to detecting the first air gesture: in accordance with a determination that the first air gesture is a first type of moving air gesture, performing, based on movement of the first air gesture, a first operation while continuing to output the content; and in accordance with a determination that the first air gesture is a second type of moving air gesture different from the first type of moving air gesture, performing, based on the movement of the first air gesture, a second operation, different from the first operation, while no longer outputting, via the one or more output devices, the content.

In some embodiments, a computer system that is in communication with one or more input devices and one or more output devices is described. In some embodiments, the computer system that is in communication with one or more input devices and one or more output devices comprises means for performing each of the following steps: while outputting, via the one or more output devices, content, detecting, via the one or more input devices, a first air gesture; and in response to detecting the first air gesture: in accordance with a determination that the first air gesture is a first type of moving air gesture, performing, based on movement of the first air gesture, a first operation while continuing to output the content; and in accordance with a determination that the first air gesture is a second type of moving air gesture different from the first type of moving air gesture, performing, based on the movement of the first air gesture, a second operation, different from the first operation, while no longer outputting, via the one or more output devices, the content.

In some embodiments, a computer program product is described. In some embodiments, the computer program product comprises one or more programs configured to be executed by one or more processors of a computer system that is in communication with one or more input devices and one or more output devices. In some embodiments, the one or more programs include instructions for: while outputting, via the one or more output devices, content, detecting, via the one or more input devices, a first air gesture; and in response to detecting the first air gesture: in accordance with a determination that the first air gesture is a first type of moving air gesture, performing, based on movement of the first air gesture, a first operation while continuing to output the content; and in accordance with a determination that the first air gesture is a second type of moving air gesture different from the first type of moving air gesture, performing, based on the movement of the first air gesture, a second operation, different from the first operation, while no longer outputting, via the one or more output devices, the content.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for controlling devices using gestures, thereby increasing the effectiveness, efficiency, and user satisfaction with such devices. Such methods and interfaces may complement or replace other methods for controlling devices using gestures.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

The following description sets forth exemplary methods, parameters, and the like. It should be recognized, however, that such description is not intended as a limitation on the scope of the present disclosure but is instead provided as a description of exemplary examples.

There is a need for electronic devices that provide efficient methods and interfaces for controlling devices using gestures. For example, an air gesture can cause different operations to be performed depending on which user performs the air gesture. For another example, the same air gesture can be used in different modes to either transition modes and/or change content being output. For another example, different types of moving air gestures can cause different operations to be performed. Such techniques can reduce the cognitive burden on a user using an electronic device, thereby enhancing productivity. Further, such techniques can reduce processor and battery power otherwise wasted on redundant user inputs.

Figure 1:
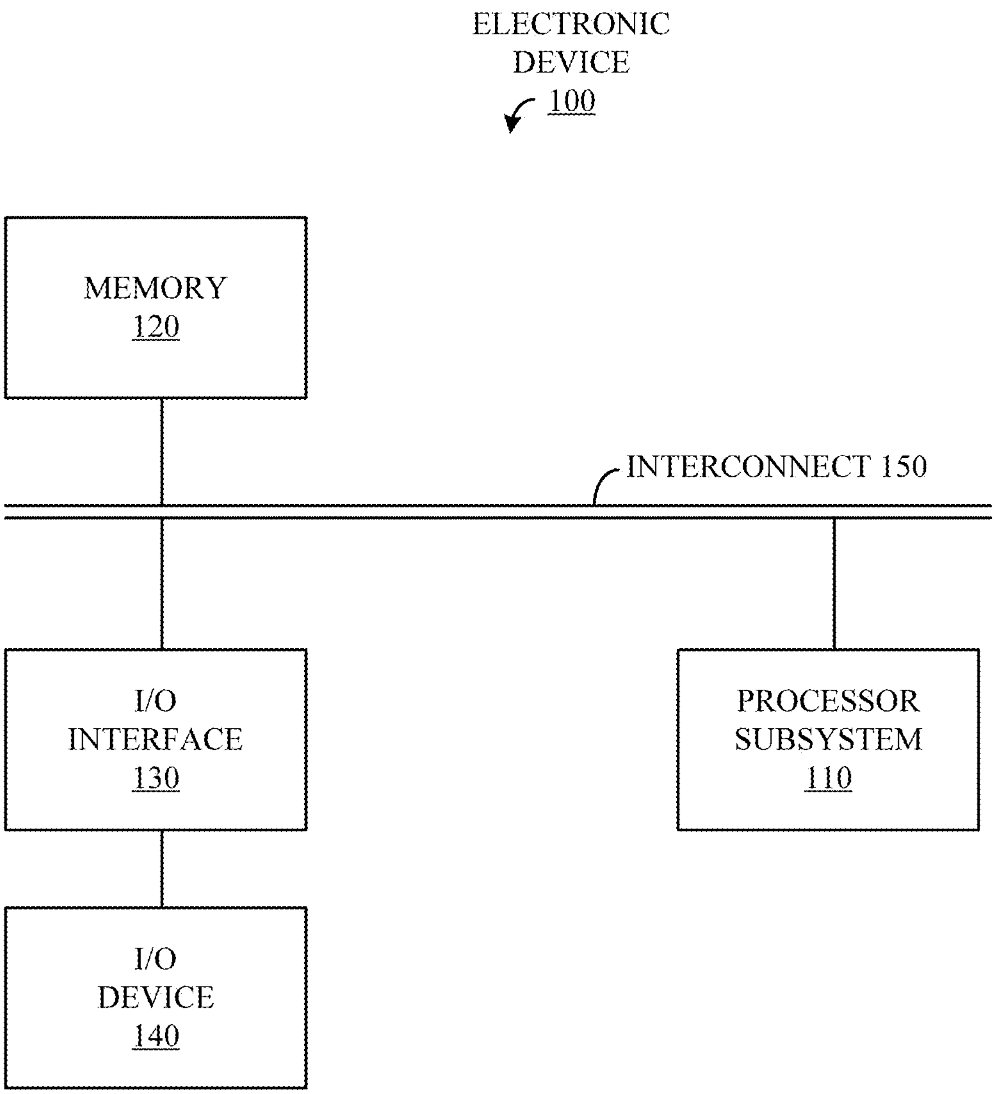
FIG. 1 is a block diagram illustrating an electronic device in accordance with some embodiments.
Figure 3:
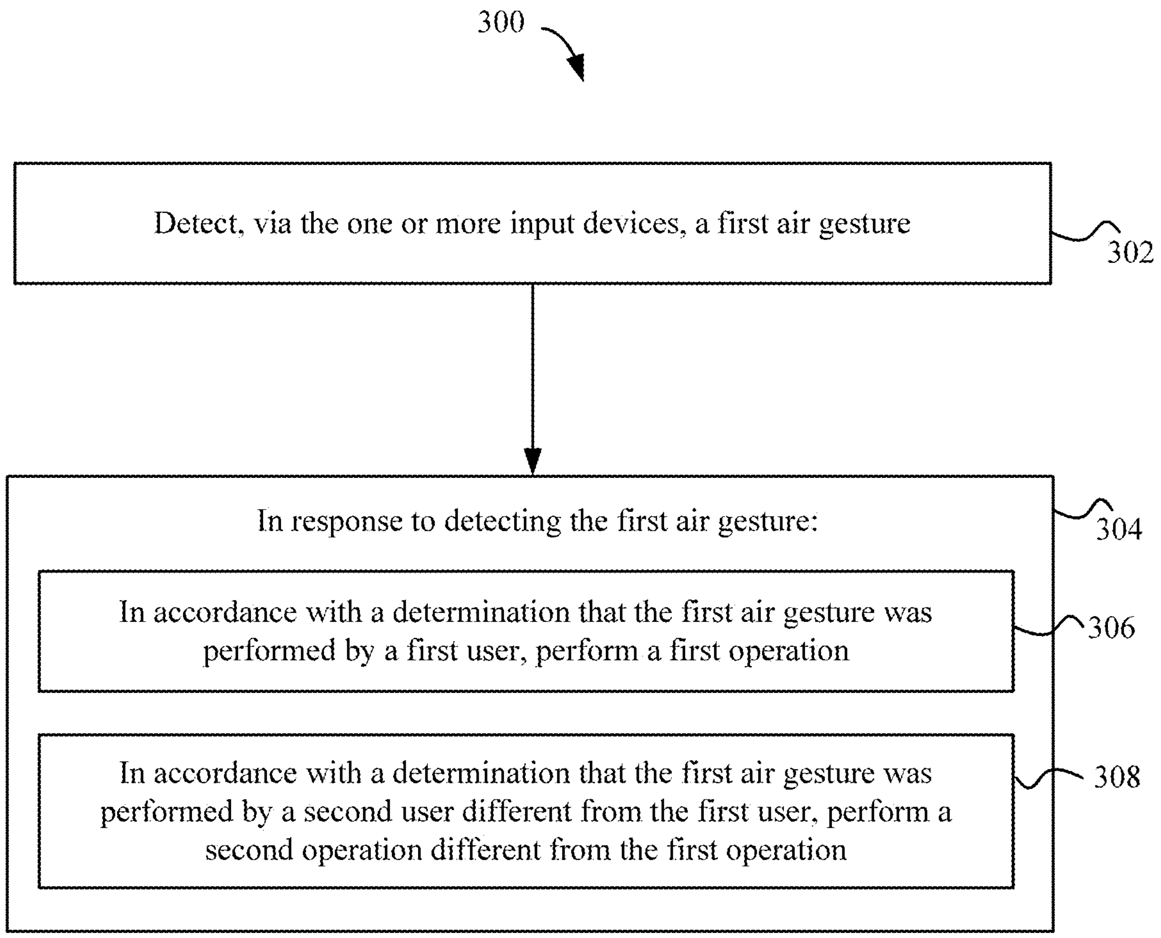
FIG. 3 is a flow diagram illustrating a method for responding to air gestures in accordance with some embodiments.
Figure 4A:
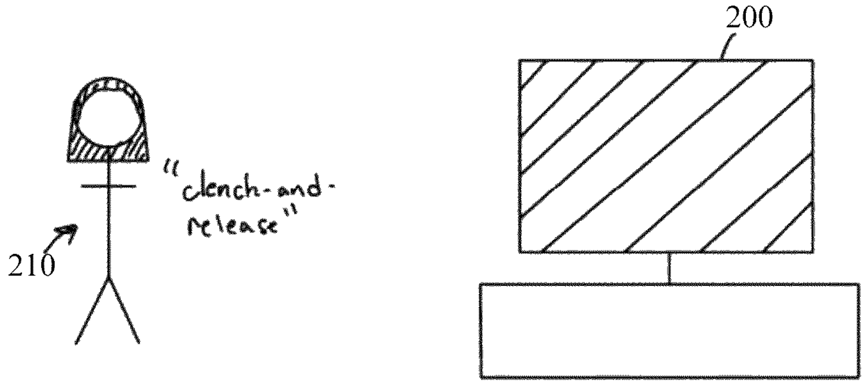
FIGS. 4A-4C illustrate techniques for responding to the same air gesture in different contexts in accordance with some embodiments.
Figure 4B:
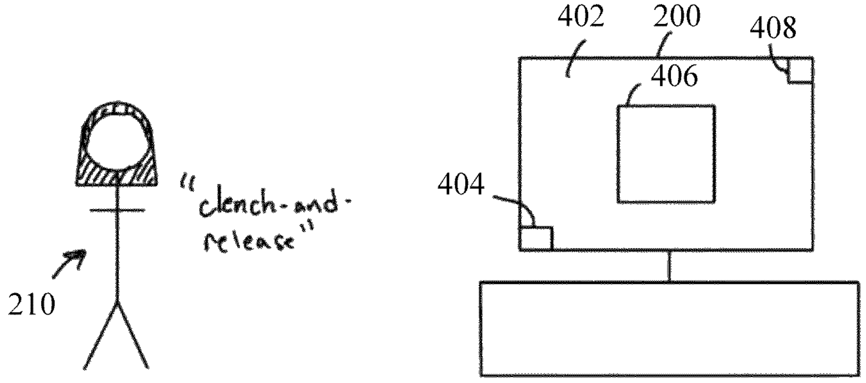
Figure 4C:
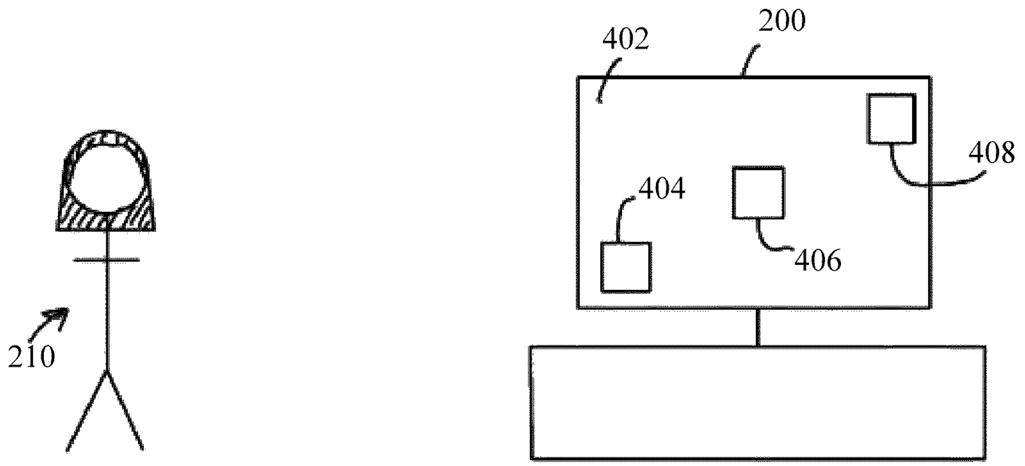
Figure 5:
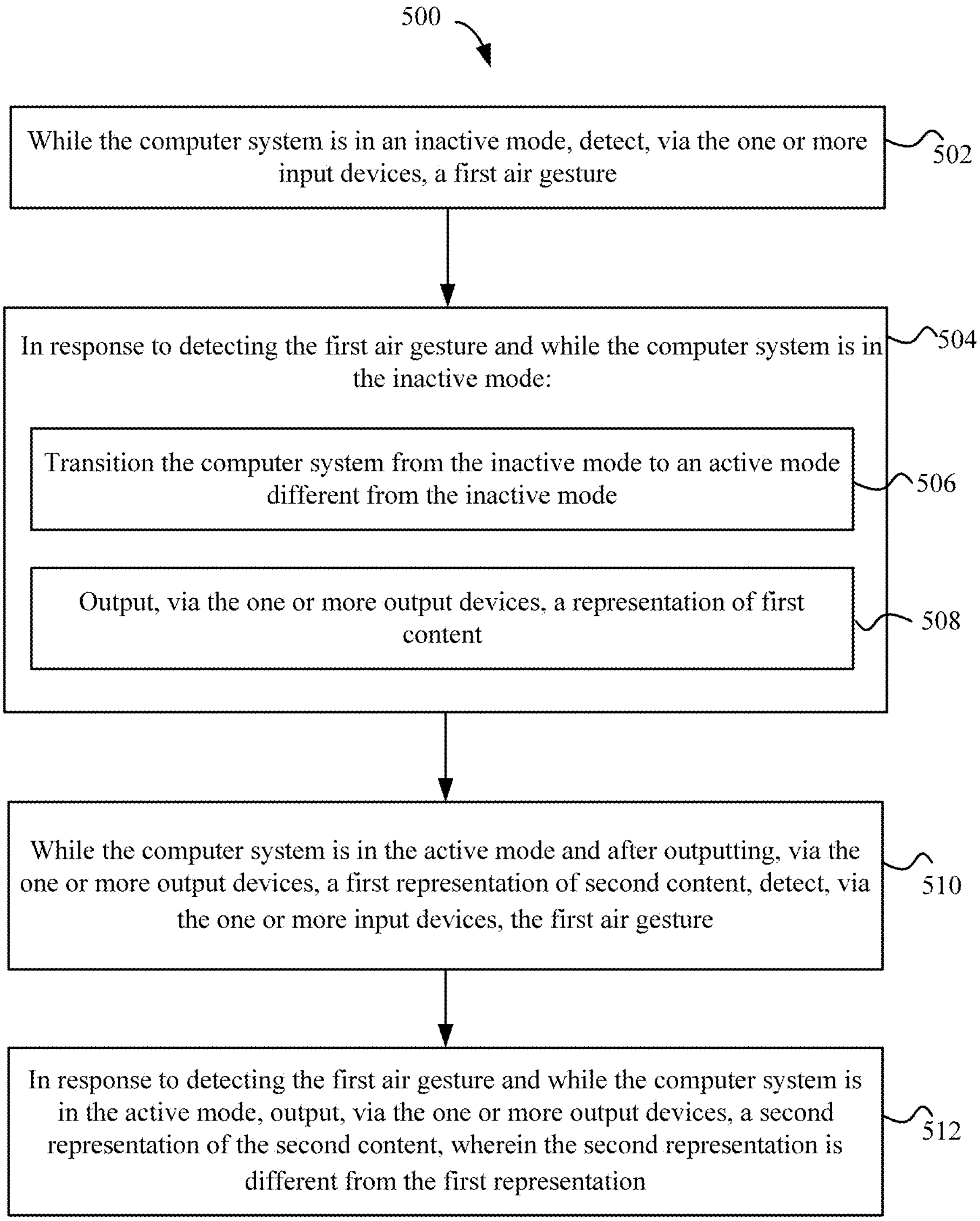
FIG. 5 is a flow diagram illustrating a method for responding to the same air gesture in different contexts in accordance with some embodiments.

Below, FIG. 1 provides a description of an exemplary device for performing techniques for controlling devices using gestures. FIGS. 2A-2E illustrate techniques for responding to air gestures in accordance with some embodiments. FIG. 3 is a flow diagram illustrating a method for responding to air gestures in accordance with some embodiments. The user interfaces in FIGS. 2A-2E are used to illustrate the processes described below, including the processes in FIG. 3. FIGS. 4A-4C illustrate techniques for responding to the same air gesture in different contexts in accordance with some embodiments. FIG. 5 is a flow diagram illustrating a method for responding to the same air gesture in different contexts in accordance with some embodiments. The user interfaces in FIGS. 4A-4C are used to illustrate the processes described below, including the processes in FIG. 5. FIGS. 6A-6D illustrate techniques for responding to different types of air gestures in accordance with some embodiments. FIG. 7 is a flow diagram illustrating a method for responding to different types of air gestures in accordance with some embodiments. The user interfaces in FIGS. 6A-6D are used to illustrate the processes described below, including the processes in FIG. 7.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

Methods described herein can include one or more steps that are contingent upon one or more conditions being satisfied. It should be understood that a method can occur over multiple iterations of the same process with different steps of the method being satisfied in different iterations. For example, if a method requires performing a first step upon a determination that a set of one or more criteria is met and a second step upon a determination that the set of one or more criteria is not met, a person of ordinary skill in the art would appreciate that the steps of the method are repeated until both conditions, in no particular order, are satisfied. Thus, a method described with steps that are contingent upon a condition being satisfied can be rewritten as a method that is repeated until each of the conditions described in the method are satisfied. This, however, is not required of electronic device, system, or computer readable medium claims where the electronic device, system, or computer readable medium claims include instructions for performing one or more steps that are contingent upon one or more conditions being satisfied. Because the instructions for the electronic device, system, or computer readable medium claims are stored in one or more processors and/or at one or more memory locations, the electronic device, system, or computer readable medium claims include logic that can determine whether the one or more conditions have been satisfied without explicitly repeating steps of a method until all of the conditions upon which steps in the method are contingent have been satisfied. A person having ordinary skill in the art would also understand that, similar to a method with contingent steps, an electronic system, system, or computer readable storage medium can repeat the steps of a method as many times as needed to ensure that all of the contingent steps have been performed.

Although the following description uses terms "first," "second," etc. to describe various elements, these elements should not be limited by the terms. In some embodiments, these terms are used to distinguish one element from another. For example, a first device could be termed a second device, and, similarly, a second device or a device could be termed a first device, without departing from the scope of the various described examples. In some embodiments, the first device and the second device are two separate references to the same device. In some embodiments, the first device and the second device are both devices, but they are not the same device or the same type of device.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when," "upon," "in response to determining," "in response to detecting," or "in accordance with a determination that" depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," or "in accordance with a determination that [the stated condition or event]" depending on the context.

Turning to FIG. 1, a block diagram of electronic device 100 is illustrated. Electronic device 100 is a non-limiting example of an electronic device that can be used to perform functionality described herein. It should be recognized that other computer architectures of an electronic device can be used to perform functionality described herein.

In the illustrated example, electronic device 100 includes processor subsystem 110 communicating with memory 120 (e.g., a system memory) and I/O interface 130 via interconnect 150 (e.g., a system bus, one or more memory locations, or other communication channel for connecting multiple components of electronic device 100). In addition, I/O interface 130 is communicating with (e.g., wired or wirelessly) I/O device 140. In some embodiments, I/O interface 130 is included with I/O device 140 such that the two are a single component. It should be recognized that there can be one or more I/O interfaces, with each I/O interface communicating with one or more I/O devices. In some embodiments, multiple instances of processor subsystem 110 can be communicating via interconnect 150.

Electronic device 100 can be any of various types of devices, including, but not limited to, a system on a chip, a server system, a personal electronic device, a smart phone, a smart watch, a wearable device, a tablet, a laptop computer, a fitness tracking device, a head-mounted display (HMD) device, a desktop computer, an accessory (e.g., switch, light, speaker, air conditioner, heater, window cover, fan, lock, media playback device, television, and so forth), a controller, a hub, and/or a sensor. In some embodiments, a sensor includes one or more hardware components that detect information about a physical environment in proximity of (e.g., surrounding) the sensor. In some embodiments, a hardware component of a sensor includes a sensing component (e.g., an image sensor or temperature sensor), a transmitting component (e.g., a laser or radio transmitter), and/or a receiving component (e.g., a laser or radio receiver). Examples of sensors include an angle sensor, a breakage sensor such as a glass breakage sensor, a chemical sensor, a contact sensor, a non-contact sensor, a flow sensor, a force sensor, a gas sensor, a humidity or moisture sensor, an image sensor (e.g., a RGB camera and/or an infrared sensor), an inertial measurement unit, a leak sensor, a level sensor, a metal sensor, a microphone, a motion sensor, a particle sensor, a photoelectric sensor (e.g., ambient light and/or solar), a position sensor (e.g., a global positioning system), a precipitation sensor, a pressure sensor, a proximity sensor, a radiation sensor, a range or depth sensor (e.g., RADAR, LiDAR), a speed sensor, a temperature sensor, a time-of-flight sensor, a torque sensor, and an ultrasonic sensor, a vacancy sensor, an voltage and/or current sensor, and/or a water sensor. In some embodiments, sensor data is captured by fusing data from one sensor with data from one or more other sensors. Although a single electronic device is shown in FIG. 1, electronic device 100 can also be implemented as two or more electronic devices operating together.

In some embodiments, processor subsystem 110 includes one or more processors or processing units configured to execute program instructions to perform functionality described herein. For example, processor subsystem 110 can execute an operating system and/or one or more applications.

Memory 120 can include a computer readable medium (e.g., non-transitory or transitory computer readable medium) usable to store (e.g., configured to store, assigned to store, and/or that stores) program instructions executable by processor subsystem 110 to cause electronic device 100 to perform various operations described herein. For example, memory 120 can store program instructions to implement the functionality associated with method 300 described below.

Memory 120 can be implemented using different physical, non-transitory memory media, such as hard disk storage, optical drive storage, floppy disk storage, removable disk storage, removable flash drive, storage array, a storage area network (e.g., SAN), flash memory, random access memory (e.g., RAM-SRAM, EDO RAM, SDRAM, DDR SDRAM, and/or RAMBUS RAM), and/or read only memory (e.g., PROM and/or EEPROM).

I/O interface 130 can be any of various types of interfaces configured to communicate with other devices. In some embodiments, I/O interface 130 includes a bridge chip (e.g., Southbridge) from a front-side bus to one or more back-side buses. I/O interface 130 can communicate with one or more I/O devices (e.g., I/O device 140) via one or more corresponding buses or other interfaces. Examples of I/O devices include storage devices (e.g., as described above with respect to memory 120), network interface devices (e.g., to a local or wide-area network), sensor devices (e.g., as described above with respect to sensors), a physical user-interface device (e.g., a physical keyboard, a mouse, and/or a joystick), and an auditory and/or visual output device (e.g., speaker, light, screen, and/or projector). In some embodiments, the visual output device is referred to as a display generation component. The display generation component is configured to provide visual output, such as display via an LED display or image projection. As used herein, "displaying" content includes causing to display the content (e.g., video data rendered or decoded by a display controller) by transmitting, via a wired or wireless connection, data (e.g., image data or video data) to an integrated or external display generation component to visually produce the content.

In some embodiments, I/O device 140 includes one or more camera sensors (e.g., one or more optical sensors and/or one or more depth camera sensors), such as for recognizing a user and/or a user's gestures (e.g., hand gestures and/or air gestures) as input. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, I/O device 140 is integrated with other components of electronic device 100. In some embodiments, I/O device 140 is separate from other components of electronic device 100. In some embodiments, I/O device 140 includes a network interface device that permits electronic device 100 to communicate with a network or other electronic devices, in a wired or wireless manner. Exemplary network interface devices include Wi-Fi, Bluetooth, NFC, USB, Thunderbolt, Ethernet, Thread, UWB, and so forth.

In some embodiments, I/O device 140 include one or more camera sensors (e.g., one or more optical sensors and/or one or more depth camera sensors), such as for tracking a user's gestures (e.g., hand gestures and/or air gestures) as input. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

Attention is now directed towards techniques that can be implemented on an electronic device, such as electronic device 100.

FIGS. 2A-2E illustrate techniques for responding to air gestures in accordance with some embodiments. The user interfaces in these figures are used to illustrate the processes described below, including the processes in FIG. 3.

FIGS. 2A-2E illustrate computer system 200 responding to different air gestures performed by different users (e.g., people). In some embodiments, computer system 200 is a television that includes one or more components and/or features described above in relation to electronic device 100. It should be recognized that computer system 200 can be other types of electronic devices, including a smart phone, a smart watch, a smart display, a tablet, a laptop, a fitness tracking device, and/or a head-mounted display device.

While discussed below that computer system 200 detects air gestures and, in response, performs operations, it should be recognized that one or more other computer systems can detect sensor data, communicate the sensor data, detect an air gesture using the sensor data, communicate an identification of the air gesture, determine an operation to perform in response to the air gesture, and/or cause computer system 200 to perform the operation. For example, an ecosystem can include a camera for capturing media (e.g., one or more images and/or a video) of an environment, a controller device (e.g., as described further below) for detecting an air gesture in the media and causing computer system 200 to perform an operation based on detecting the air gesture. For another example, a user can be wearing a head-mounted display device that includes a camera for capturing air gestures performed by the user. The head-mounted display device can receive content (e.g., one or more images and/or a video) from the camera, identify an air gesture in the content, and cause computer system 200 to perform an operation based on the air gesture. For another example, a user can be wearing a smart watch that includes a gyroscope for capturing air gestures performed by the user. The smart watch can receive sensor data from the gyroscope, identify an air gesture using the sensor data, send an identification of the air gesture to another computer system (e.g., a smart phone) so that the smart phone can cause computer system 200 to perform different operations based on the air gesture.

Figure 2A:
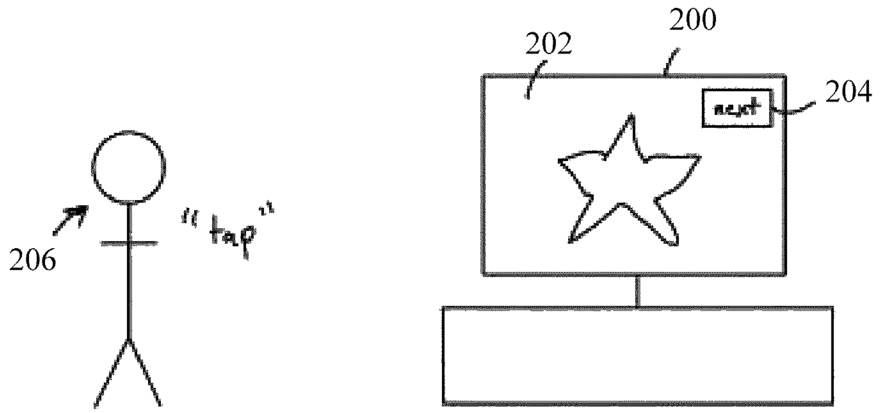
FIGS. 2A-2E illustrate techniques for responding to air gestures in accordance with some embodiments.

As illustrated by FIG. 2A, a first person (e.g., first user 206) is in an environment including computer system 200. Computer system 200 is displaying photo user interface 202 that includes a first photo with a star and a user interface button (e.g., next button 204) that, when selected, causes computer system 200 to proceed to a next photo.

At FIG. 2A, first user 206 performs a first type of air gesture (e.g., a tap gesture). In some embodiments, the tap gesture is an air gesture where a user extends a single finger and moves the single finger and/or a hand including the single finger downward. In some embodiments, the tap gesture includes a direction in which the tap gesture is directed. In some embodiments, the direction is used to determine a target of the tap gesture (e.g., a user-interface element intended to be selected by the tap gesture). It should be recognized that a tap gesture can include a different movement and/or position than explicitly described in this paragraph. At FIG. 2A, computer system 200 detects the tap gesture has been performed by first user 206 to select next button 204 (e.g., directed toward next button 204).

Figure 2B:
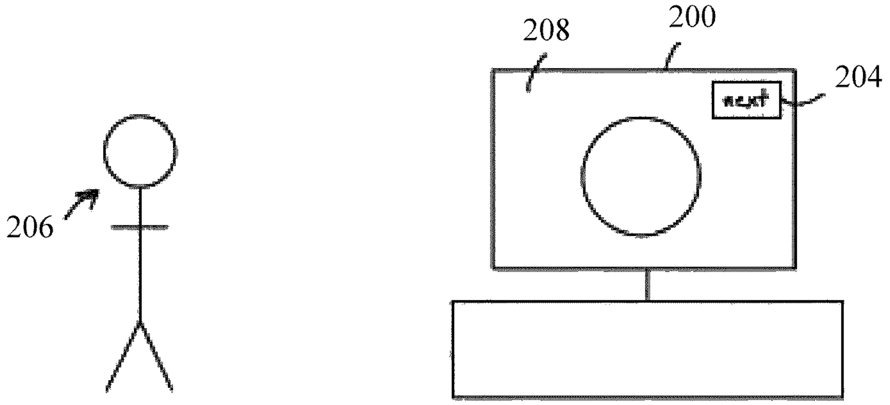

As illustrated in FIG. 2B, in response to detecting the tap gesture has been performed by first user 206, computer system 200 (1) ceases displaying photo user interface 202 that includes the first photo with the star and (2) displays photo user interface 208 that includes a second photo with a circle and next button 204. It should be recognized that displaying photo user interface 208 is just one example of an operation performed in response to detecting the tap gesture has been performed by first user 206. In some embodiments, one or more other operations are performed in response to detecting the tap gesture being performed by first user 206, including outputting audio and/or displaying a different user-interface element and/or user interface. In some embodiments, an operation performed in response to detecting the tap gesture of first user 206 is based on a user interface being displayed by computer system 200. For example, different user interfaces being displayed while detecting the tap gesture has been performed by first user 206 would cause different operations to be performed (e.g., by computer system 200 and/or another computer system different from computer system 200).

In some embodiments, the operation performed in response to detecting a particular air gesture does not depend on which user performed the air gesture and/or what user interface is being displayed by computer system 200. For example, different users performing the particular air gesture while displaying the same or different user interface would cause the same operation to be performed.

Figure 2C:
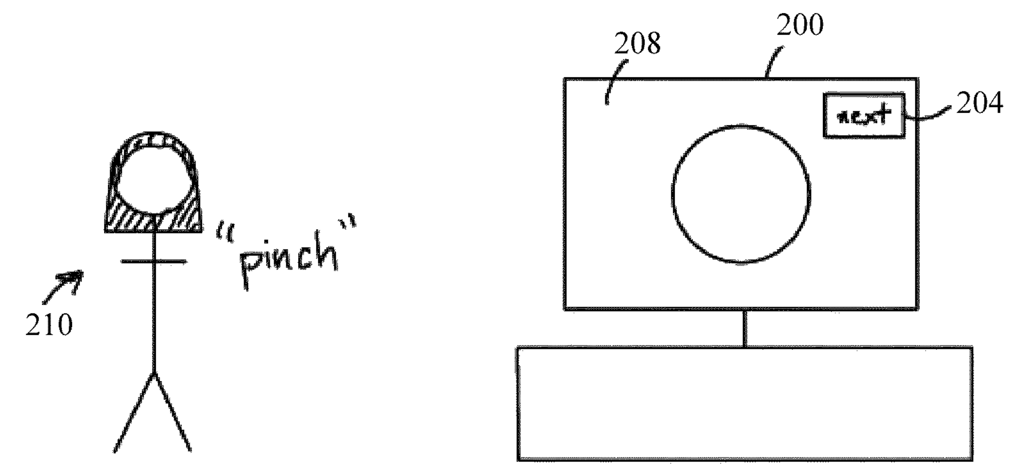

As illustrated by FIG. 2C, a second person (e.g., second user 210) is in an environment including computer system 200. Computer system 200 is displaying photo user interface 208 that includes the second photo with a circle and next button 204.

At FIG. 2C, second user 210 performs a second type of air gesture (e.g., a pinch gesture) that is different from the first type of air gesture (e.g., the tap gesture). In some embodiments, the pinch gesture is an air gesture where a user brings a finger and/or a thumb in toward each other. In some embodiments, the pinch gesture includes a direction in which the pinch gesture is directed. In some embodiments, the direction is used to determine a target of the pinch gesture (e.g., a portion of a user interface intended to be the target of the pinch gesture). It should be recognized that a tap gesture can include a different movement and/or position than explicitly described in this paragraph. At FIG. 2C, computer system 200 detects the pinch gesture has been performed by second user 210 to select next button 204 (e.g., directed toward next button 204).

Figure 2D:
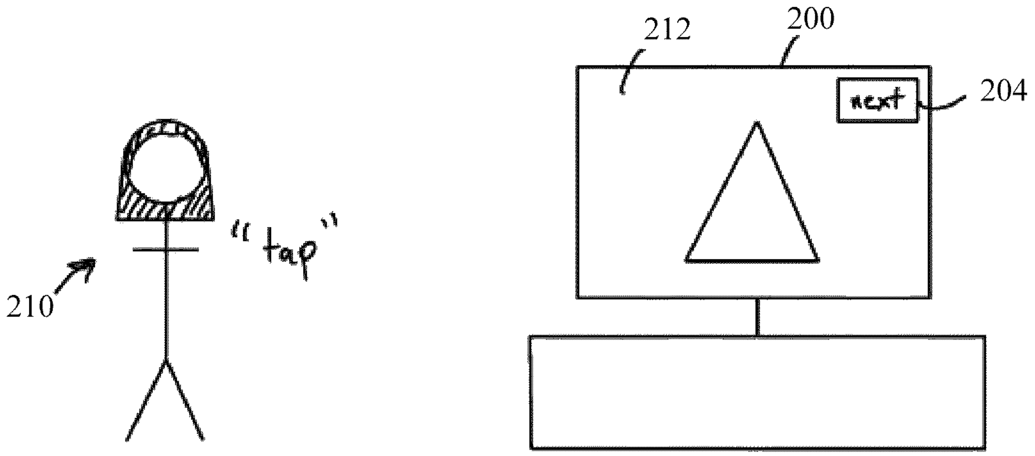

As illustrated in FIG. 2D, in response to detecting the pinch gesture has been performed by second user 210, computer system 200 (1) ceases displaying photo user interface 208 that includes the second photo with the circle and (2) displays photo user interface 212 that includes a third photo with a triangle and next button 204. It should be recognized that displaying photo user interface 212 is just one example of an operation performed in response to detecting the pinch gesture has been performed by second user 210.

Notably, the pinch gesture is a different type of gesture than the tap gesture described above with respect to FIG. 2A, though both gestures are interpreted as performing a selection operation on next button 204. In some embodiments, the selection operation corresponding to the tap gesture and/or the pinch gesture is predefined by first user 206, second user 210, and/or another user (e.g., a user of computer system 200). For example, the tap gesture can be defined to correspond to the selection operation when performed by first user 206. For another example, pinch tap gesture can be defined to correspond to the selection operation when performed by second user 210. In some embodiments, one or more other operations are performed in response to detecting the pinch gesture being performed by second user 210, including outputting audio and/or displaying a different user-interface element and/or user interface. In some embodiments, an operation performed in response to detecting the pinch gesture is based on a user interface being displayed by computer system 200. For example, different user interfaces being displayed while detecting the pinch gesture has been performed by second user 210 would cause different operations to be performed (e.g., by computer system 200 and/or another computer system different from computer system 200).

At FIG. 2D, second user 210 performs the first type of air gesture (e.g., the tap gesture). Notably, second user 210 performs the same gesture at FIG. 2D as first user 206 performed at FIG. 2A. In some embodiments, second user 210 performs the tap gesture in the same direction as first user 206 performed the tap gesture at FIG. 2A. In particular, the tap gesture performed by second user 210 is directed toward next button 204. At FIG. 2D, computer system 200 detects the tap gesture has been performed by second user 210.

Figure 2E:
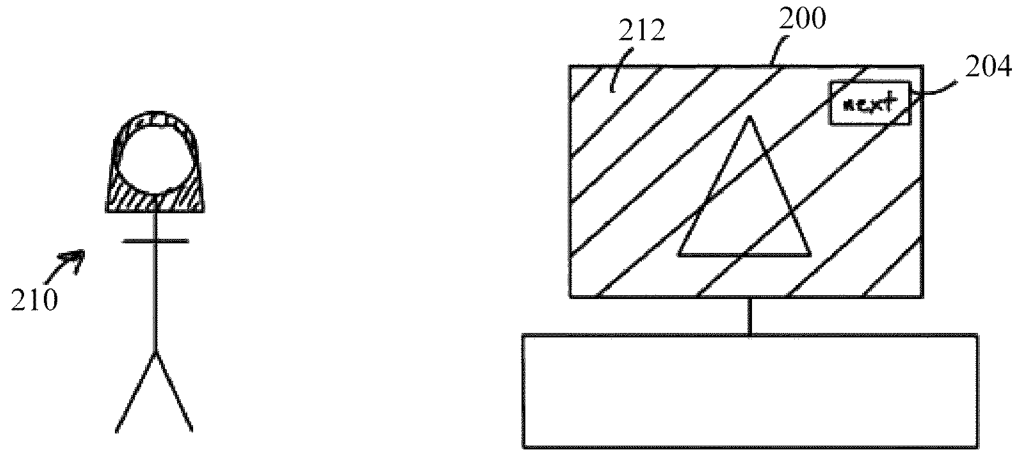

As illustrated in FIG. 2E, in response to detecting the tap gesture has been performed by second user 210, computer system 200 dims (e.g., lowers the light output setting of computer system 200, causing a user interface to appear darker) photo user interface 212 that includes the third photo with the triangle and next button 204. Notably, photo user interface 212 does not cease to be displayed and another user interface is not caused to be displayed. It should be recognized that dimming photo user interface 212 in response to detecting the tap gesture is just one example of an operation performed in response to detecting the tap gesture has been performed by second user 210.

As mentioned above, the tap gesture performed by second user 210 at FIG. 2D is the same type of gesture that first user 206 performed at FIG. 2A though each gesture is interpreted to cause a different operation to be performed (e.g., the tap gesture performed by first user 206 performs a selection operation, and the tap gesture performed by second user 210 performs a dimming operation). In some embodiments, the selection operation corresponding to the tap gesture is predefined by first user 206 and/or another user (e.g., a user of computer system 200). For example, the tap gesture can be defined to correspond to the selection operation when performed by first user 206. In some embodiments, the dimming operation corresponding to the tap gesture is predefined by second user 210 and/or another user (e.g., a user of computer system 200). For example, the tap gesture can be defined to correspond to the dimming operation when performed by second user 210. In some embodiments, one or more other operations are performed in response to detecting the tap gesture being performed by second user 210, including outputting audio and/or displaying a different user-interface element and/or user interface. In some embodiments, an operation performed in response to detecting the tap gesture of second user 210 is based on a user interface being displayed by computer system 200. For example, different user interfaces being displayed while detecting the pinch gesture has been performed by second user 210 would cause different operations to be performed (e.g., by computer system 200 and/or another computer system different from computer system 200).

While the above embodiments described different types of air gestures that cause different operations to be performed, it should be recognized that an air gesture performed at a different speed and/or acceleration can cause different operations and/or types of operations to be performed. For example, an air gesture performed quickly can result in audio no longer being output while the same air gesture performed slowly can result in audio continuing to be output though a different user interface to be displayed. In some embodiments, the different user interface can also be displayed in response to the air gesture performed quickly.

While the above embodiments described different air gestures that cause different operations to be performed, it should be recognized that an air gesture can be configured for one user and not another. For example, the air gesture can be configured to perform an operation when performed by one user; however, the same air gesture is not configured to perform an operation when performed by the other user. In some embodiments, the one user and the other user are both users that are identified users for computer system 200 (e.g., computer system 200 is able to identify both users as a user for which computer system 200 recognizes as a particular user). In some embodiments, the other user is an unidentified user for computer system 200 (e.g., computer system 200 is not able to identify the other user as a user for which computer system 200 recognizes as a particular user).

In some embodiments, operations performed in response to air gestures performed by unidentified users are different from operations performed by identified users. For example, the same air gesture performed by an identified user and an unidentified user can result in different operations being performed. In some embodiments, a particular operation is performed in response to a particular air gesture irrespective of whether an identified or unidentified user performed the particular air gesture.

FIG. 3 is a flow diagram illustrating a method (e.g., method 300) for responding to air gestures in accordance with some embodiments. Some operations in method 300 are, optionally, combined, the orders of some operations are, optionally, changed, and some operations are, optionally, omitted.

As described below, method 300 provides an intuitive way for using air gestures. Method 300 reduces the cognitive burden on a user for using air gestures, thereby creating a more efficient human-machine interface. For battery-operated computing devices, enabling a user to use air gestures to perform tasks faster and more efficiently conserves power and increases the time between battery charges.

In some embodiments, method 300 is performed at a computer system (e.g., 100, 200, and/or another computer system) that is in communication with one or more input devices (e.g., a camera, a depth sensor, and/or a microphone). In some embodiments, the computer system is an accessory, a controller, a fitness tracking device, a watch, a phone, a tablet, a processor, a head-mounted display (HMD) device, and/or a personal computing device.

The computer system detects (302), via the one or more input devices, a first air gesture (e.g., “tap” in FIG. 2A, “pinch” in FIG. 2C, and/or “tap” in FIG. 2D). In response to (304) detecting the first air gesture, in accordance with a determination that the first air gesture was (and/or is being) performed by a first user (e.g., 206 or 210) (e.g., a person, a user, an animal, an object, and/or a device) (and/or that the air gesture is a first type and/or corresponds to the first operation (e.g., as a result of being performed by the first user)), the computer system performs (306) a first operation (e.g., proceed to next photo between FIGS. 2A and 2B, proceed to next photo between FIGS. 2C and 2D, or change state of 200 between FIGS. 2D and 2E) (e.g., displays content, changes an appearance of content, changes a form of a representation of content, displays a new user interface and/or user-interface element, outputs audio, and/or changes a setting (e.g., brightness, volume, contrast, and/or size of a window) of the computer system). In some embodiments, performing the first operation includes causing a device in communication with the computer system to perform an operation.

In response to (304) detecting the first air gesture, in accordance with a determination that the first air gesture was (and/or is being) performed by a second user (e.g., 206 or 210) different from the first user, the computer system performs (308) a second operation (e.g., proceed to next photo between FIGS. 2A and 2B, proceed to next photo between FIGS. 2C and 2D, or change state of 200 between FIGS. 2D and 2E) different from the first operation (e.g., without performing the first operation). In some embodiments, the computer system identifies a user to determine whether the user is the first user, the second user, or another user different from the first user and/or the second user. In some embodiments, the second operation is a different type of operation (e.g., visual, auditory, and/or haptic) (e.g., selection, zoom, scroll, minimize, maximize, and/or close). In some embodiments, the first operation is performed in response to detecting the air gesture without the computer system performing the second operation. In some embodiments, performing the second operation includes causing a device in communication with the computer system to perform an operation. In some embodiments, it is important to note that the same device is performing differently depending on who is performing the first air gesture. It should be recognized that, in some embodiments, this is not merely detecting a particular air gesture to perform a particular operation, changing the particular air gesture to perform another operation, and, after changing, detecting the particular air gesture to perform the other operation. Performing different operations depending on which user performed an air gesture allows the computer system to cater its operation to a particular user, including by allowing the same air gesture to mean different things for different users, thereby reducing the number of inputs needed to perform an operation, providing additional control options without cluttering the user interface with additional displayed controls, and/or performing an operation when a set of conditions has been met without requiring further user input.

In some embodiments, the computer system is in communication with a first display generation component (e.g., a display screen, a projector, and/or a touch-sensitive display). In some embodiments, while displaying, via the first display generation component, a respective user interface (e.g., 202, 208, and/or 212), the computer system detects, via the one or more input devices, a second air gesture (e.g., "tap" in FIG. 2A, "pinch" in FIG. 2C, and/or "tap" in FIG. 2D) (e.g., different from the first air gesture). In some embodiments, in response to detecting the second air gesture, in accordance with a determination that the respective user interface is a first user interface (e.g., corresponds to a first type (e.g., corresponds to a first application and/or includes a button, window, slider, image, text, and/or video)) (and/or that the second air gesture was performed by a particular user), the computer system performs a third operation (e.g., proceed to next photo between FIGS. 2A and 2B, proceed to next photo between FIGS. 2C and 2D, or change state of 200 between FIGS. 2D and 2E) (e.g., of a third type (e.g., display operation, change-setting operation, audio-output operation, haptic-output operation, and/or cause a state of another device to change)). In some embodiments, in response to detecting the second air gesture, in accordance with a determination that the respective user interface is a second user interface different from the first user interface (e.g., corresponds to a second type different from the first type) (and/or that the second air gesture was performed by the particular user) (and/or that the second air gesture was performed by another user different from the particular user (e.g., irrespective of different people)), the computer system performs a fourth operation (e.g., of a fourth type different from the third type) different from the third operation. In some embodiments, the second user interface differs from the first user interface in that the second user interface includes a user interface element not included in the first user interface. In some embodiments, the second user interface differs from the first user interface in that the first user interface includes a user interface element not included in the second user interface. In some embodiments, the first user interface corresponds to a first application executing on the computer system. In some embodiments, the second user interface corresponds to a second application executing on the computer system. In some embodiments, the first application is different from the second application. In some embodiments, the first application is the same as the second application. Performing different operations in response to an air gesture depending on which user interface is displayed allows the computer system to cater its operation to what is being displayed, including by allowing the same air gesture to mean different things for different user interfaces, thereby providing improved visual feedback to the user, reducing the number of inputs needed to perform an operation, providing additional control options without cluttering the user interface with additional displayed controls, and/or performing an operation when a set of conditions has been met without requiring further user input.

In some embodiments, after detecting the first air gesture, the computer system detects, via the one or more input devices, a third air gesture (e.g., "tap" in FIG. 2A, "pinch" in FIG. 2C, and/or "tap" in FIG. 2D) (e.g., different from the first air gesture). In some embodiments, in response to detecting the third air gesture, in accordance with a determination that the third air gesture was performed by a third user (e.g., 206 or 210) and that the third air gesture is a first type of air gesture (e.g., pinch, swipe (e.g., swipe in a particular direction), tap, spread (e.g., spread in a particular direction), and/or form a circle), the computer system performs a fifth operation (e.g., proceed to next photo between FIGS. 2A and 2B, proceed to next photo between FIGS. 2C and 2D, or change state of 200 between FIGS. 2D and 2E). In some embodiments, in response to detecting the third air gesture, in accordance with a determination that the third air gesture was performed by a fourth user (e.g., 206 or 210), different from the third user, and that the third air gesture is a second type of air gesture (e.g., "tap" from FIG. 2A v. "pinch from FIG. 2C) different from the first type of air gesture, the computer system performs the fifth operation. In some embodiments, after performing the fifth operation in accordance with the determination that the third air gesture was performed by the third user and that the third air gesture is the first type of air gesture, the computer system detects, via the one or more input devices, another air gesture. In some embodiments, in response to detecting the other air gesture and in accordance with a determination that the other air gesture is the second type of air gesture, the computer system performs the fifth operation. Performing the fifth operation when different users perform different types of air gestures allows the computer system to cater its operation to different users, including by allowing different air gestures to mean the same thing for different users, thereby reducing the number of inputs needed to perform an operation, providing additional control options without cluttering the user interface with additional displayed controls, and/or performing an operation when a set of conditions has been met without requiring further user input.

In some embodiments, after detecting the first air gesture, the computer system detects, via the one or more input devices, a fourth air gesture. In some embodiments, in response to detecting the fourth air gesture, in accordance with a determination that the fourth air gesture was performed by a fifth user (and/or that the fourth air gesture is a third type of air gesture), the computer system performs a sixth operation. In some embodiments, in response to detecting the fourth air gesture, in accordance with a determination that the fourth air gesture was performed by a sixth user different from the fifth user (and/or that the fourth air gesture is the third type of air gesture), the computer system forgoes performing the sixth operation (and/or any operation (e.g., ignores the fourth operation)). In some embodiments, in response to detecting the fourth air gesture and in accordance with a determination that the fourth air gesture was performed by the sixth user (and/or that the fourth air gesture is a third type of air gesture), the computer system performs another operation different from the sixth operation. Performing the sixth operation in response to detecting the fourth air gesture from the fifth user but not the sixth user allows the computer system to cater its operation to different users, including by allowing an air gesture to only perform operations for certain users and to adapt performing operations based on whether the air gesture is pre-configured for a user, thereby reducing the number of inputs needed to perform an operation, providing additional control options without cluttering the user interface with additional displayed controls, performing an operation when a set of conditions has been met without requiring further user input, and/or increasing security.

In some embodiments, after detecting the first air gesture, the computer system detects, via the one or more input devices, a fifth air gesture. In some embodiments, in response to detecting the fifth air gesture, in accordance with a determination that the fifth air gesture was performed at (and/or includes a portion with) a fifth speed (e.g., 1.5 inches per second), the computer system performs a seventh operation. In some embodiments, in response to detecting the fifth air gesture, in accordance with a determination that the fifth air gesture was performed at (and/or includes a portion with) a sixth speed different from the fifth speed, the computer system performs an eighth operation different from the seventh operation, wherein a difference between the seventh operation and the eighth operation is not based on a difference between the fifth speed and the sixth speed (e.g., two identical gestures that are performed at slower and faster speeds do not correspond to a quicker and slower execution of an operation). In some embodiments, the difference between the fifth speed and the sixth speed is above a certain threshold (e.g., the fifth speed being 1.50 inches per second and the sixth speed being 1.501 inches per second does not constitute a difference in speed). Performing different operations depending on a speed that an air gesture is performed with allows the computer system to have a wider range of different air gestures, including differentiating air gestures not only on type of air gesture but also on speed, thereby reducing the number of inputs needed to perform an operation, providing additional control options without cluttering the user interface with additional displayed controls, and/or performing an operation when a set of conditions has been met without requiring further user input.

In some embodiments, after detecting the first air gesture, the computer system detects, via the one more input devices, a respective air gesture (e.g., "tap" in FIG. 2A and/or "pinch" in FIG. 2C). In some embodiments, in response to detecting the respective air gesture, in accordance with a determination that the respective air gesture is a sixth air gesture (e.g., an air gesture of a particular type) and that the respective air gesture was performed by a seventh user (e.g., 206 or 210), the computer system performs a ninth operation (e.g., proceed to next photo between FIGS. 2A and 2B and/or proceed to next photo between FIGS. 2C and 2D). In some embodiments, in response to detecting the respective air gesture, in accordance with a determination that the respective air gesture is the sixth air gesture and that the respective air gesture was performed by an eighth user (e.g., 206 or 210) different from the seventh user, the computer system forgoes performing the ninth operation. In some embodiments, in response to detecting the respective air gesture, in accordance with a determination that the respective air gesture is a seventh air gesture (e.g., an air gesture of another type different from the particular type) (e.g., an air gesture of the same type as the sixth air gesture but performed with different speed, acceleration, and/or direction), different from the sixth air gesture, and that the respective air gesture was performed by the seventh user, the computer system forgoes performing the ninth operation. In some embodiments, in response to detecting the respective air gesture, in accordance with a determination that the respective air gesture is the seventh air gesture and that the respective air gesture was performed by the eighth user, the computer system performs the ninth operation. In some embodiments, the sixth air gesture being performed by the eight user causes a default (or custom) operation to be performed. In some embodiments, the sixth air gesture being performed by the eighth user does not cause the default (or custom) operation to be performed. In some embodiments, the seventh air gesture being performed by the seventh user causes another default (or custom) operation to be performed. In some embodiments, the seventh air gesture being performed by the seventh user does not cause the other default (or custom) operation to be performed. Performing the ninth operation if the sixth air gesture was performed by the seventh user and forgoing performing the ninth operation if performed by the eight user and performing the ninth operation if the seventh air gesture was performed by the eight user and forgoing performing the ninth operation if performed by the seventh user in response to detecting the respective air gesture allows the computer system to adapt operations based on the air gesture performed and the user who performed it, thereby reducing the number of inputs needed to perform an operation, providing additional control options without cluttering the user interface with additional displayed controls, performing an operation when a set of conditions has been met without requiring further user input, and/or increasing security.

In some embodiments, the computer system is in communication with a second display generation component (e.g., a display screen, a projector, and/or a touch-sensitive display). In some embodiments, performing the first operation includes displaying, via the second display generation component, one or more user interface elements (e.g., circle in FIG. 2B, triangle in FIG. 2D). Performing the first operation including displaying one or more user interface elements allows the computer system to (1) provide visual feedback and/or visual cues in response to detecting the first air gesture and/or (2) increase engagement based on visual output, thereby providing improved visual feedback to the user and/or performing an operation when a set of conditions has been met without requiring further user input.

In some embodiments, the computer system is in communication with a third display generation component (e.g., a display screen, a projector, and/or a touch-sensitive display). In some embodiments, performing the second operation includes displaying, via the third display generation component, one or more user interface elements (e.g., circle in FIG. 2B, triangle in FIG. 2D). In some embodiments, the one or more user interface elements displayed when performing the first operation are different from the one or more user interface elements displayed when performing the second operation. Performing the second operation including displaying one or more user interface elements allows the computer system to (1) provide visual feedback and/or visual cues in response to detecting the first air gesture and/or (2) increase engagement based on visual output, thereby providing improved visual feedback to the user and/or performing an operation when a set of conditions has been met without requiring further user input.

In some embodiments, the computer system is in communication with a first audio generation component (e.g., a speaker). In some embodiments, performing the first operation includes outputting, via the first audio generation component, first audio content. Performing the first operation including outputting first audio content allows the computer system to (1) provide auditory feedback and/or auditory cues in response to detecting the first air gesture and/or (2) increase engagement based on audio output, thereby performing an operation when a set of conditions has been met without requiring further user input.

In some embodiments, the computer system is in communication with a second audio generation component (e.g., a speaker). In some embodiments, performing the second operation includes outputting, via the second audio generation component, second audio content. In some embodiments, the second audio content is different from the first audio content. In some embodiments, the second audio content is the same as the first audio content. Performing the second operation including outputting second audio content allows the computer system to (1) provide auditory feedback and/or auditory cues in response to detecting the first air gesture and/or (2) increase engagement based on audio output, thereby performing an operation when a set of conditions has been met without requiring further user input.

In some embodiments, the computer system is in communication with (and/or includes, such as within an enclosure of the computer system) one or more cameras. In some embodiments, the first air gesture is detected via (and/or using output from) the one or more cameras. The first air gesture being detected via one or more cameras provides the computer system with hardware to detect an air gesture based on visual characteristics, thereby reducing the number of inputs needed to perform an operation and/or performing an operation when a set of conditions has been met without requiring further user input.

In some embodiments, after detecting the first air gesture, the computer system detects, via the one more input devices, an eighth air gesture. In some embodiments, in response to detecting the eighth air gesture, in accordance with a determination that the eighth air gesture was performed by a ninth user and that the ninth user is an unidentified user (e.g., an identity of the ninth user is not known and/or not determined by the computer system) (e.g., an unknown user and/or a guest), the computer system performs a tenth operation (e.g., a default operation that does not correspond to a particular user). In some embodiments, in response to detecting the eighth air gesture, in accordance with a determination that the eighth air gesture was performed by the ninth user and that the ninth user is an identified user (e.g., an identity of the ninth user is known and/or determined by the computer system) (e.g., a known user and/or a registered user), the computer system performs an eleventh operation (e.g., an operation corresponding to the ninth user) different form the tenth operation. In some embodiments, performing the eleventh operation includes performing more functionality and/or more changes to the computer system than the tenth operation. In some embodiments, the eleventh operation uses data corresponding to the ninth user while the tenth operation does not use data corresponding to the ninth user. Performing different operations depending on whether a user performing an air gesture is an identified user or an unidentified user allows the computer system to cater its operation to a particular user, including by optionally (1) reducing the functionality of the computer system to unidentified users and/or increasing the functionality of the computer system to identified users and/or (2) having user-defined operations for identified users and default operations for unidentified users, thereby reducing the number of inputs needed to perform an operation, providing additional control options without cluttering the user interface with additional displayed controls, and/or performing an operation when a set of conditions has been met without requiring further user input.

Note that details of the processes described above with respect to method 300 (e.g., FIG. 3) are also applicable in an analogous manner to other methods described herein. For example, method 500 optionally includes one or more of the characteristics of the various methods described above with reference to method 300. For example, in response to detecting the first air gesture of method 500, different operations can be performed depending on which user performed the first air gesture as described in method 300. For brevity, these details are not repeated below.

FIGS. 4A-4C illustrate techniques for responding to the same air gesture in different contexts in accordance with some embodiments. The user interfaces in these figures are used to illustrate the processes described below, including the processes in FIG. 5.

FIGS. 4A-4C illustrate computer system 200 responding to the same air gesture in a different way depending on whether computer system 200 is in a first mode or a second mode (e.g., a lower power mode). In some embodiments, the first mode and the second mode are different operating states of computer system 200, and operations performed in response to the same air gesture in the different operating states is not a configuration by a user for what operation to perform for a specific gesture (e.g., an operating state is what defines what operation is performed instead of a user configuration). Examples of the first mode include a higher power mode, an unlocked mode, a mode with a higher level of brightness being output by a display generation component, a mode that is attempting to sense additional types of input, a mode that performs operations in response to one or more additional air gestures, and/or a mode that has access to additional functionality as compared to the second mode. Examples of the second mode include a lower power mode, a locked mode, a mode with a lower level of brightness being output by the display generation component, a mode that is attempting to sense less types of input, a mode that performs operations in response to one or more less air gestures, and/or a mode that has access to less functionality as compared to the first mode. It should be recognized that other types of context can cause different operations to be performed, including different content being displayed, different applications providing content to be used for display, and/or different users being logged into computer system 200.

Consistent with discussions above, while discussed below that computer system 200 detects air gestures and, in response, performs operations, it should be recognized that one or more other computer systems can detect sensor data, communicate the sensor data, detect an air gesture using the sensor data, communicate an identification of the air gesture, determine an operation to perform in response to the air gesture, and/or cause computer system 200 to perform the operation.

As illustrated in FIG. 4A, the second person (e.g., second user 210) is in an environment including computer system 200. Computer system 200 is in a lower power mode (e.g., a display generation component and/or one or more sensors of computer system 200 is turned off, in an inactive state, and/or performing using lower power than when in full operation) and is not displaying a user interface. In some embodiments, while in the lower power mode, at least one sensor in communication with computer system 200 is at least partially active and attempting to detect performance of an air gesture with respect to computer system 200. For example, a camera can be capturing one or more images at a slower rate than when computer system 200 is in a higher power mode than the lower power mode. For another example, another computer system being worn by second user 210 can include one or more sensors (e.g., a camera, a gyroscope, a depth sensor, and/or an accelerometer) to detect an air gesture performed by second user 210 with respect to computer system 200.

At FIG. 4A, second user 210 performs a third type of air gesture (e.g., a clench-and-release gesture) while computer system 200 is in the lower power mode. In some embodiments, the clench-and-release gesture is an air gesture where a user starts with a closed first and opens the closed first to have their fingers spread out. In some embodiments, the clench-and-release gesture does not include a direction in which the clench-and-release gesture is directed and instead is directionless (e.g., not directed in a particular direction). In other embodiments, the clench-and-release gesture includes a direction in which the clench-and-release gesture is directed. In some embodiments, the direction is used to determine a target of the clench-and-release gesture (e.g., a portion of a user interface intended to be the clench-and-release of the pinch gesture). In some embodiments, the clench-and-release gesture includes a direction at times and does not include a direction at other times, such as when a different user interface and/or user-interface element is displayed, when the clench-and-release gesture is performed by a different user, when computer system 200 is in a different mode (e.g., a lower or higher power mode), and/or which operation is defined to correspond to the clench-and-release gesture. It should be recognized that a clench-and-release gesture can include a different movement and/or position than explicitly described in this paragraph. At FIG. 4A, while computer system 200 is in the lower power mode, computer system 200 detects the clench-and-release gesture has been performed (e.g., by second user 210 or by a user in the environment).

As illustrated in FIG. 4B, in response to detecting the clench-and-release gesture has been performed while computer system 200 is in the lower power mode, computer system 200 (1) transitions into a higher power mode as compared to the lower power mode and (2) displays user interface 402 that includes multiple boxes of a first size (e.g., boxes 404, 406, and 808). It should be recognized that transitioning into the higher power mode and displaying user interface 402 is just an example of operations performed in response to detecting the clench-and-release gesture at FIG. 4A. In some embodiments, one or more other operations are performed in response to detecting the clench-and-release gesture at FIG. 4A, including outputting audio and/or displaying a different user-interface element and/or user interface.

At FIG. 4B, second user 210 performs the third type of air gesture (e.g., the clench-and-release gesture) while computer system 200 is in the higher power mode. Notably, second user 210 performs the same gesture at FIG. 4B as second user 210 performed at FIG. 4A. At FIG. 4B, while computer system 200 is in the higher power mode, computer system 200 detects the clench-and-release gesture has been performed (e.g., by second user 210 or by a user in the environment).

As illustrated in FIG. 4C, in response to detecting the clench-and-release gesture has been performed while computer system 200 is in the higher power mode, computer system 200 modifies what is displayed in user interface 402 by computer system 200. For example, FIG. 4C illustrates that computer system 200 zooms out user interface 402 relative to FIG. 4B (e.g., boxes 404, 406, and 408 are smaller in FIG. 4C as compared to in FIG. 4B). Notably, the clench-and-release gesture does not change the mode in which computer system 200 is operating and/or display a new user interface. Instead, the same air gesture, which previously caused computer system 200 to operate in the higher power mode and display user interface 402, causes user interface 402 to display content in a different manner (e.g., zoomed out). It should be recognized that zooming out user interface 402 in response to detecting the clench-and-release gesture is just one example of an operation performed in response to detecting the clench-and-release gesture while computer system 200 is in the higher power mode. Other examples of operations that can occur include zooming in, scrolling, changing a color contrast in, moving a portion (e.g., a user-interface element within) of, moving, and/or outputting audio corresponding to user interface 402.

In some embodiments, an operation performed in response to detecting the clench-and-release while computer system 200 is in the higher power mode is based on a user interface and/or content being displayed by computer system 200. For example, different user interfaces and/or content being displayed while detecting the clench-and-release while computer system 200 is in the higher power mode would cause one or more different operations to be performed (e.g., by computer system 200 and/or another computer system different from computer system 200), such as zooming in, scrolling, changing a color contrast in, moving a portion (e.g., a user-interface element within) of, moving, and/or outputting audio corresponding to the different user interfaces and/or content.

While the example above described what occurs when detecting the clench-and-release gesture has been performed while computer system 200 is in the higher power mode, it should be recognized that one or more other types of input (e.g., verbal, touch, hardware, and/or gaze input) can perform similar or same operations (e.g., zoom out user interface 402 relative to FIG. 4B) as the clench-and-release gesture (e.g., multiple types of inputs are configured to perform the similar or same operations as described above with respect to the clench-and-release gesture). For example, a verbal request to zoom out user interface 402 can cause computer system 200 to zoom out user interface 402. For another example, pressing a hot-key combination of one or more keys on a keyboard and/or selecting a user-interface element of user interface 402 can cause computer system 200 to zoom out user interface 402.

In some embodiments, while in the higher power mode and displaying user interface 402 as illustrated in FIG. 4C, computer system 200 detects another air gesture (e.g., the same type of air gesture (e.g., the same gesture) or a different type of air gesture as compared to the third type of air gesture) and, in response, causes content (e.g., boxes 404, 406, and/or 808) of user interface 402 to no longer be displayed without displaying another representation (e.g., zoomed in, zoomed out, scrolled, moved, and/or otherwise modified) of the content of user interface 402. In some embodiments, detecting the other air gestures causes a new user interface to be displayed, the new user interface not including content corresponding to user interface 402 but rather content different from the content of user interface 402. For example, detecting the other air gesture while user interface 402 is at a maximum or minimum zoom level can cause computer system 200 to replace user interface 402 with another user interface, such as a home screen and/or a lock screen of computer system 200.

In some embodiments, while in the higher power mode and displaying user interface 402 as illustrated in FIG. 4C, computer system 200 detects an additional air gesture (e.g., the same type of air gesture (e.g., the same gesture) or a different type of air gesture as compared to the third type of air gesture) and, in response, causes content (e.g., boxes 404, 406, and/or 408) of user interface 402 to continue to be displayed. In some embodiments, the additional air gesture causes the content of user interface 402 to be zoomed in, zoomed out, scrolled, moved, and/or otherwise modified as compared to FIG. 4C. In some embodiments, the additional air gesture causes one or more operations other than modifying content included in user interface 402 to be modified, such as outputting audio, causing haptic feedback, and/or causing an accessory device to change states.

In some embodiments, while in the higher power mode and displaying user interface 402 as illustrated in FIG. 4C, computer system 200 detects a different input than the third type of air gesture (e.g., a different type of input and/or a different type of air gesture) and, in response, causes computer system 200 to transition to the lower power mode discussed above. Notably in some embodiments, the same air gesture that causes computer system to transition to the higher power mode is not able to be used to reverse the transition to go back to the lower power mode. Instead, computer system 200 must detect the different input to transition back to the lower power mode. It should be recognized that, in some embodiments, the different input can cause computer system 200 to transition to a different mode than the lower power mode, such as a locked mode, a mode with a lower level of brightness being output by the display generation component, a mode that is attempting to sense less types of input, a mode that performs operations in response to one or more less air gestures, and/or a mode that has access to less functionality as compared to the mode in which computer system 200 was operating with detecting the different input.

In some embodiments, while in the higher power mode, computer system 200 determines (and/or detects) that an input (e.g., user input) has not been detected within a threshold period of time since a previous input and/or outputting content and, in response, transitions to the lower power mode as discussed above.

FIG. 5 is a flow diagram illustrating a method (e.g., method 500) for responding to the same air gesture in different contexts in accordance with some embodiments. Some operations in method 500 are, optionally, combined, the orders of some operations are, optionally, changed, and some operations are, optionally, omitted.

As described below, method 500 provides an intuitive way for responding to the same air gesture in different contexts. Method 500 reduces the cognitive burden on a user for using air gestures, thereby creating a more efficient human-machine interface. For battery-operated computing devices, enabling a user to use air gestures to perform tasks faster and more efficiently conserves power and increases the time between battery charges.

In some embodiments, method 500 is performed at a computer system (e.g., 100, 200, and/or another computer system) that is in communication with one or more input devices (e.g., a camera, a depth sensor, and/or a microphone) and one or more output devices (e.g., a display generation component, an audio generation component, a speaker, a haptic output device, a display screen, a projector, and/or a touch-sensitive display). In some embodiments, the computer system is an accessory, a controller, a fitness tracking device, a watch, a phone, a tablet, a processor, a head-mounted display (HMD) device, and/or a personal computing device.

While the computer system is in an inactive mode (e.g., as described above with respect to FIG. 4A) (e.g., a locked mode, a lower power mode, a sleep mode, and/or an off mode) (e.g., while at least one output device of the one or more output devices is turned off and/or inactive) (e.g., while the one or more output devices is turned off and/or inactive), the computer system detects (502), via the one or more input devices, a first air gesture (e.g., the clench-and-release gesture described above with respect to FIG. 4A) (e.g., a pinch gesture, a tap gesture, a swipe gesture, a select gesture, a close hand gesture, an open hand gesture, and/or a zoom gesture).

In response to (504) detecting the first air gesture and while the computer system is in the inactive mode, the computer system transitions (506) the computer system from the inactive mode to an active mode (e.g., as described above with respect to FIG. 4B) (e.g., an unlocked mode, a higher power mode, and/or an on mode) different from the inactive mode (e.g., activates the one or more output devices and/or activates an output device of the one or more output devices).

In response to (504) detecting the first air gesture and while the computer system is in the inactive mode, the computer system outputs (508), via the one or more output devices, a representation of first content (e.g., as described above with respect to FIG. 4B, including boxes 404, 406, and 408) (e.g., 402 in FIG. 4B). In some embodiments, the representation of the first content is the first content at a particular size, audio level, and/or font type.

While the computer system is in the active mode and after (and/or while) outputting, via the one or more output devices, a first representation of second content (e.g., the first content and/or another content different from the first content) (and/or after outputting the representation of the first content) (e.g., as described above with respect to FIG. 4B, including boxes 404, 406, and 408) (e.g., 402), the computer system detects (510), via the one or more input devices, the first air gesture (e.g., the clench-and-release gesture described above with respect to FIG. 4B). In some embodiments, the first representation of the second content is the representation of the first content. In some embodiments, the representation of the first content is the first representation of the second content.

In response to detecting the first air gesture and while the computer system is in the active mode, the computer system outputs (512), via the one or more output devices, a second representation of the second content (e.g., without outputting the first representation of the second content) (e.g., as described above with respect to FIG. 4C, including boxes 404, 406, and 408) (e.g., 402 in FIG. 4C), wherein the second representation is different from the first representation. In some embodiments, outputting the second representation of the second content includes changing the first representation of the second content to the second representation of the second content. Performing different operations (e.g., (1) outputting the representation of the first content and transitioning the computer system from the inactive mode to the active mode or (2) outputting the second representation of the second content) in response to detecting the first air gesture depending on what mode (e.g., active or inactive mode) the computer system is in enables the computer system to cater its operations to the mode that it is in and re-use some gestures in different modes to perform different operations, thereby performing an operation when a set of conditions has been met without requiring further user input, providing additional control options without cluttering the user interface with additional displayed controls, and/or providing improved feedback to the user. Outputting different representations of content in response to detecting the same air gesture as used to (1) output content and (2) transition from an inactive mode to an active mode enables the computer system to increase its accessibility via air gestures (e.g., using the same air gesture for multiple purposes), conceptualize the act of changing states (e.g., changing state (e.g., mode) of computer system and changing state of content (e.g., different representations of the same content), maintain air gesture detection while in an inactive mode, and/or increase functionality for air gestures depending on a current mode (e.g., the first air gesture causes a binary operation while in the inactive mode while causing fine-grained manipulation while in the active mode (e.g., the ability to change not just between two states while in the active mode), thereby performing an operation when a set of conditions has been met without requiring further user input, providing additional control options without cluttering the user interface with additional displayed controls, and/or providing improved feedback to the user.

In some embodiments, the inactive mode includes a first power setting (e.g., a power mode and/or a profile of energy usage). In some embodiments, the first power setting is of the computer system. In some embodiments, the active mode includes a second power setting. In some embodiments, the first power setting is lower than (and/or different from) the second power setting. In some embodiments, the inactive mode is a lower power mode than the active mode. In some embodiments, the second power setting is of the computer system. In some embodiments, the inactive mode includes a third power setting (e.g., a power mode and/or a profile of energy usage). In some embodiments, the active mode includes a fourth power setting. In some embodiments, the fourth power setting is higher than the third power setting. In some embodiments, the active mode is a higher power mode than the inactive mode. In some embodiments, one or more components and/or functions do not operate in the inactive mode but do operate in the active mode. Performing different operations (e.g., (1) outputting the representation of the first content and transitioning the computer system from the inactive mode to the active mode or (2) outputting the second representation of the second content) in response to detecting the first air gesture depending on a current power setting enables the computer system to cater its operations to the current power setting and operate differently depending on an amount of power configured to be used, thereby performing an operation when a set of conditions has been met without requiring further user input, providing additional control options without cluttering the user interface with additional displayed controls, and/or providing improved feedback to the user.

In some embodiments, the one or more input devices includes one or more cameras (e.g., a telephoto camera, a wide-angle camera, and/or an ultra-wide-angle camera). In some embodiments, detecting the first air gesture is performed via the one or more cameras. Performing different operations (e.g., (1) outputting the representation of the first content and transitioning the computer system from the inactive mode to the active mode or (2) outputting the second representation of the second content) in response to detecting the first air gesture, via one or more cameras, depending on what mode (e.g., active or inactive mode) the computer system is in enables the computer system to continue to provide visual detection capabilities in an inactive mode while reusing such gestures in an active mode for different operations, thereby performing an operation when a set of conditions has been met without requiring further user input, providing additional control options without cluttering the user interface with additional displayed controls, and/or providing improved feedback to the user.

In some embodiments, the one or more output devices includes a first display generation component (e.g., a display generation component, an audio generation component, a speaker, a haptic output device, a display screen, a projector, and/or a touch-sensitive display). In some embodiments, outputting the representation of the first content includes displaying, via the first display generation component, a representation of third content (e.g., different from the representation of the first content, corresponding to the first content, and/or the same as the representation of the first content). Performing different operations (e.g., (1) displaying the representation of the third content and transitioning the computer system from the inactive mode to the active mode or (2) outputting the second representation of the second content) in response to detecting the first air gesture depending on what mode (e.g., active or inactive mode) the computer system is in enables the computer system to cater its operations, including displaying content, to the mode that it is in, thereby performing an operation when a set of conditions has been met without requiring further user input, providing additional control options without cluttering the user interface with additional displayed controls, and/or providing improved feedback to the user.

In some embodiments, the one or more output devices includes an audio generation component (e.g., a speaker). In some embodiments, outputting the representation of the first content includes outputting, via the audio generation component, audio content (e.g., auditory content, music content, chime content, and/or vocal content) corresponding to the first content. Performing different operations (e.g., (1) outputting the representation of the first content auditorily and transitioning the computer system from the inactive mode to the active mode or (2) outputting the second representation of the second content) in response to detecting the first air gesture depending on what mode (e.g., active or inactive mode) the computer system is in enables the computer system to cater its operations, including auditorily outputting content, to the mode that it is in, thereby performing an operation when a set of conditions has been met without requiring further user input, providing additional control options without cluttering the user interface with additional displayed controls, and/or providing improved feedback to the user.

In some embodiments, the one or more output devices includes a second display generation component (e.g., a display screen, a projector, and/or a touch-sensitive display). In some embodiments, outputting the first representation of the second content includes displaying, via the second display generation component, a first representation of fourth content (e.g., different from the first representation of the second content, corresponding to the second content, and/or the same as the first representation of the second content). Performing different operations (e.g., (1) displaying a first representation of fourth content and transitioning the computer system from the inactive mode to the active mode or (2) outputting the second representation of the second content) in response to detecting the first air gesture depending on what mode (e.g., active or inactive mode) the computer system is in enables the computer system to cater its operations, including displaying content, to the mode that it is in, thereby performing an operation when a set of conditions has been met without requiring further user input, providing additional control options without cluttering the user interface with additional displayed controls, and/or providing improved feedback to the user.

In some embodiments, outputting the second representation of the second content includes displaying, via the second display generation component, a second representation of the fourth content (e.g., different from the second representation of the second content, corresponding to the second content, and/or the same as the second representation of the second content) different from the first representation of the fourth content. Performing different operations (e.g., (1) outputting the representation of the first content and transitioning the computer system from the inactive mode to the active mode or (2) displaying a second representation of fourth content) in response to detecting the first air gesture depending on what mode (e.g., active or inactive mode) the computer system is in enables the computer system to cater its operations, including displaying representations of content, to the mode that it is in, thereby performing an operation when a set of conditions has been met without requiring further user input, providing additional control options without cluttering the user interface with additional displayed controls, and/or providing improved feedback to the user.

In some embodiments, the one or more output devices includes a third display generation component (e.g., a display generation component, an audio generation component, a speaker, a haptic output device, a display screen, a projector, and/or a touch-sensitive display). In some embodiments, outputting the first representation of the second content includes displaying, via the third display generation component, a representation of fifth content at a first zoom level (e.g., a magnification and/or a view size). In some embodiments, outputting the second representation of the second content includes displaying, via the third display generation component, the representation of fifth content at a second zoom level different from the first zoom level. In some embodiments, displaying the representation of the fifth content at the second zoom level includes moving the representation of the fifth content to the second zoom level from the first zoom level (e.g., displaying an animation of the representation of the fifth content moving to the second zoom level and/or displaying the representation of the fifth content at the first zoom level and subsequently displaying the representation of the fifth content at the second zoom level). Outputting the first representation of the second content including displaying the representation of the fifth content at the first zoom level and outputting the second representation of the second content including displaying the representation of fifth content at the second zoom level enables the computer system to cater the display of content at a zoom level to the mode the computer system is in, thereby performing an operation when a set of conditions has been met without requiring further user input, providing additional control options without cluttering the user interface with additional displayed controls, and/or providing improved visual feedback to the user.

In some embodiments, the one or more output devices includes a fourth display generation component (e.g., a display generation component, an audio generation component, a speaker, a haptic output device, a display screen, a projector, and/or a touch-sensitive display). In some embodiments, outputting the first representation of the second content includes displaying, via the fourth display generation component, a representation of sixth content (e.g., different from the first representation of the second content, corresponding to the first content, and/or the same as the first representation of the second content) at a first location. In some embodiments, outputting the second representation of the second content includes displaying, via the fourth display generation component, the representation of sixth content at a second location different from the first location. In some embodiments, displaying the representation of the sixth content at the second location includes moving the representation of the sixth content to the second location from the first location (e.g., displaying an animation of the representation of the sixth content moving to the second location and/or displaying the representation of the sixth content at the first location and subsequently displaying the representation of the sixth content at the second location). Outputting the first representation of the second content including displaying the representation of sixth content at the first location and outputting the second representation of the second content including displaying the representation of sixth content at the second location enables the computer system to cater the display of content at a location to the mode the computer system is in, thereby performing an operation when a set of conditions has been met without requiring further user input, providing additional control options without cluttering the user interface with additional displayed controls, and/or providing improved visual feedback to the user.

In some embodiments, the one or more output devices includes a fifth display generation component (e.g., a display generation component, an audio generation component, a speaker, a haptic output device, a display screen, a projector, and/or a touch-sensitive display). In some embodiments, outputting the first representation of the second content includes displaying, via the fifth display generation component, a first portion of seventh content (e.g., different from the first representation of the second content, corresponding to the first content, and/or the same as the first representation of the second content). In some embodiments, outputting the second representation of the second content includes displaying, via the fifth display generation component, a second portion of the seventh content, wherein the second portion is at least partially different from the first portion. In some embodiments, displaying the second portion of the seventh content includes scrolling the seventh content from the first portion to the second portion. In some embodiments, the second portion is scrolled up or down relative to the first portion. In some embodiments, the second portion is at least partially the same as the first portion (e.g., scrolling to a point where some of the first portion remains). In some embodiments, the second portion is completely different from the first portion. Outputting the first representation of the second content including displaying the first portion of seventh content and outputting the second representation of the second content including displaying the second portion of the seventh content enables the computer system to cater scrolled content to the mode the computer system is in, thereby performing an operation when a set of conditions has been met without requiring further user input, providing additional control options without cluttering the user interface with additional displayed controls, and/or providing improved visual feedback to the user.

In some embodiments, the one or more output devices includes a sixth display generation component (e.g., a display screen, a projector, and/or a touch-sensitive display). In some embodiments, outputting the first representation of the second content includes displaying, via the sixth display generation component, a first set of one or more colors (e.g., blue, yellow, and/or red). In some embodiments, outputting the second representation of the second content includes displaying, via the sixth display generation component, a second set of one or more colors different from the first set of one or more colors. In some embodiments, the second set of one or more colors includes at least one different color than the first set of one or more colors. Outputting the first representation of the second content including displaying a first set of one or more colors and outputting the second representation of the second content including displaying a second set of one or more colors enables the computer system to cater displayed colors to the mode the computer system is in, thereby performing an operation when a set of conditions has been met without requiring further user input, providing additional control options without cluttering the user interface with additional displayed controls, and/or providing improved visual feedback to the user.

In some embodiments, outputting the second representation of the second content includes displaying, via the seventh display generation component, the second representation of the second content. In some embodiments, while displaying the second representation of the second content, the computer system detects, via the one or more input devices, a second air gesture different (and/or separate) from the first air gesture. In some embodiments, in response to detecting the second air gesture, the computer system ceases displaying the second representation of the second content without outputting another (and/or any) representation of the second content (e.g., in response to detecting the second air gesture, the computer system no longer displays a representation of the second content) (e.g., in response to detecting the second air gesture, the computer system ceases displaying all and/or any representations of the second content). In some embodiments, the second air gesture is separate from the first air gesture but the same as the first air gesture. In some embodiments, the second air gesture is separate from the first air gesture and different from the first air gesture. In some embodiments, in response to detecting the second air gesture, the computer system ceases displaying the second representation of the second content and outputs, via the one or more output devices, a third representation of fifth content (e.g., a new user interface) different from the second representation of the second content. In some embodiments, the fifth content is different from the second content. In some embodiments, while outputting the second representation of the second content, detecting, via the one or more output devices, a third air gesture different from the first air gesture. In some embodiments, in response to detecting the third air gesture, the computer system causes no representation of the second content to be displayed. In some embodiments, in response to detecting the third air gesture, the computer system causes any (and/or all) representations of the second content to no longer be displayed. In some embodiments, in response to detecting the third air gesture, the computer system causes the second representation of the second content to no longer be output without outputting another representation of the second content. Ceasing displaying the second representation of the second content without outputting another representation of the second content in response to detecting the second air gesture enables the computer system to cease display of content as directed by the user, thereby performing an operation when a set of conditions has been met without requiring further user input, providing additional control options without cluttering the user interface with additional displayed controls, and/or providing improved visual feedback to the user.

In some embodiments, while outputting the second representation of the second content, the computer system detects, via the one or more input devices, a fourth air gesture different from the first air gesture. In some embodiments, in response to detecting the fourth air gesture, the computer system continues (and/or maintains) outputting the second representation of the second content. In some embodiments, the third air gesture is separate from the first air gesture and the same as the first air gesture. In some embodiments, the third air gesture is separate from the first air gesture and different from the first air gesture. Outputting the second representation of the second content in response to detecting the fourth air gesture enables the computer system to maintain display of the second content as directed by the user, thereby performing an operation when a set of conditions has been met without requiring further user input, providing additional control options without cluttering the user interface with additional displayed controls, and/or providing improved feedback to the user.

In some embodiments, the first air gesture is a first type of air gesture (e.g., a pinch type, tap type, and/or swipe type air gesture). In some embodiments, while the computer system is in the active mode and while outputting the first representation of the second content, the computer system detects, via the one or more input devices, a fifth air gesture different from the first air gesture. In some embodiments, in response to detecting the fifth air gesture and in accordance with a determination that the fifth air gesture is of a second type of air gesture different from the first type of air gesture, the computer system outputs, via the one or more output devices, the second representation of the second content. In some embodiments, the second representation of the second content is output in response to detecting the first air gesture and in accordance with a determination that the first air gesture is the first type of air gesture. Outputting the second representation of the second content in response to detecting the fifth air gesture and in accordance with a determination that the fifth air gesture is of the second type of air gesture enables the computer system to perform different operations based on the type of air gesture detected, thereby performing an operation when a set of conditions has been met without requiring further user input, providing additional control options without cluttering the user interface with additional displayed controls, and/or providing improved feedback to the user.

In some embodiments, after outputting the second representation of the second content, the computer system outputs, via the one or more output devices, eighth content. In some embodiments, while outputting the eighth content, the computer system detects, via the one or more input devices, a sixth air gesture separate from the first air gesture, wherein the sixth air gesture is the same as the first air gesture. In some embodiments, in response to detecting the sixth air gesture, in accordance with a determination that the eighth content is a first type (e.g., corresponds to a first application, includes an image, includes text, includes a video, and/or is received from another computer system different from the computer system), the computer system causes a first operation (e.g., changing an appearance of the respective content, changing a form of representation of the respective content, modifying the respective content to appear differently, displaying a new user interface element, outputting audio corresponding to the respective content, and/or changing a setting (e.g., brightness, volume, contrast, and/or size of a window) of the computer system) to be performed (e.g., the computer system performs and/or causes another computer system to perform the first operation) (e.g., without causing the second operation to be performed). In some embodiments, in response to detecting the sixth air gesture, in accordance with a determination that the eighth content is a second type different from the first type, the computer system causes a second operation different from the first operation to be performed (e.g., the computer system performs and/or causes another computer system to perform the second operation) without causing the first operation to be performed. Causing the first operation to be performed in accordance with the determination that the eighth content is the first type and causing the second operation different from the first operation to be performed in accordance with the determination that the eighth content is the second type enables the computer system to perform different operations when content is being output as directed by the user, thereby performing an operation when a set of conditions has been met without requiring further user input, providing additional control options without cluttering the user interface with additional displayed controls, and/or providing improved visual feedback to the user.

In some embodiments, the first air gesture is a third type of air gesture. In some embodiments, after (and/or while) outputting the second representation of the second content, the computer system detects, via the one or more input devices, a sixth air gesture (e.g., different from the first air gesture or the same as the first air gesture). In some embodiments, in response to detecting the sixth air gesture, in accordance with a determination that the sixth air gesture corresponds to a fourth type of air gesture different from the third type of air gesture, the computer system transitions the computer system from the active mode to the inactive mode. In some embodiments, in response to detecting the sixth air gesture, in accordance with a determination that the sixth air gesture corresponds to the third type of air gesture, the computer system forgoes transitioning the computer system from the active mode to the inactive mode (e.g., the computer system maintains the computer system in the active mode). Transitioning the computer system from the active mode to the inactive mode in accordance with the determination that the sixth air gesture corresponds to the fourth type of air gesture and forgoing transitioning the computer system from the active mode to the inactive mode in accordance with the determination that the sixth air gesture corresponds to the third type of air gesture enables the computer system to transition to a different mode when an air gesture is performed, thereby performing an operation when a set of conditions has been met without requiring further user input, providing additional control options without cluttering the user interface with additional displayed controls, and/or providing improved feedback to the user.

In some embodiments, while the computer system is in the active mode and after (and/or while) outputting the second representation of the second content, the computer system detects a threshold period of time has passed (e.g., since detecting the air gesture, an additional air gesture, and/or outputting content). In some embodiments, in response to detecting the threshold period of time has passed, the computer system transitions the computer system from the active mode to the inactive mode. Transitioning the computer system from the active mode to the inactive mode in response to detecting the threshold period of time has passed enables the computer system to transition the mode when no input is detected within a period of time, thereby performing an operation when a set of conditions has been met without requiring further user input, providing additional control options without cluttering the user interface with additional displayed controls, and/or providing improved feedback to the user.

Note that details of the processes described above with respect to method 500 (e.g., FIG. 5) are also applicable in an analogous manner to other methods described herein. For example, method 700 optionally includes one or more of the characteristics of the various methods described above with reference to method 500. For example, the content of method 700 can be the representation of the first content or the representation of the second content of method 500. For brevity, these details are not repeated below.

FIGS. 6A-6D illustrate techniques for responding to different types of air gestures in accordance with some embodiments. The user interfaces in these figures are used to illustrate the processes described below, including the processes in FIG. 7.

Consistent with discussions above, while discussed below that computer system 200 detects air gestures and, in response, performs operations, it should be recognized that one or more other computer systems can detect sensor data, communicate the sensor data, detect an air gesture using the sensor data, communicate an identification of the air gesture, determine an operation to perform in response to the air gesture, and/or cause computer system 200 to perform the operation.

Figure 6A:
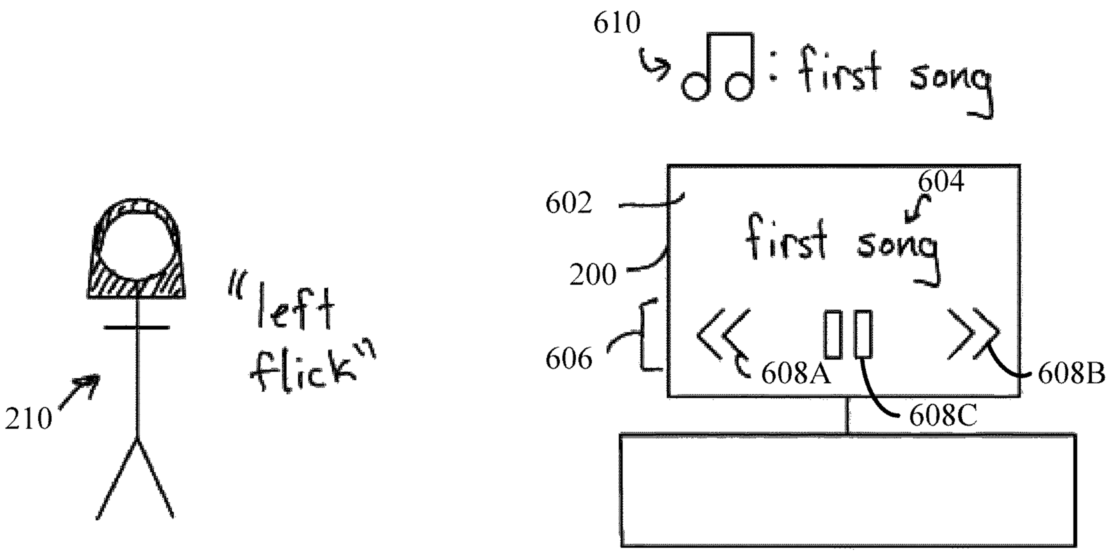
FIGS. 6A-6D illustrate techniques for responding to different types of air gestures in accordance with some embodiments.
Figure 7:
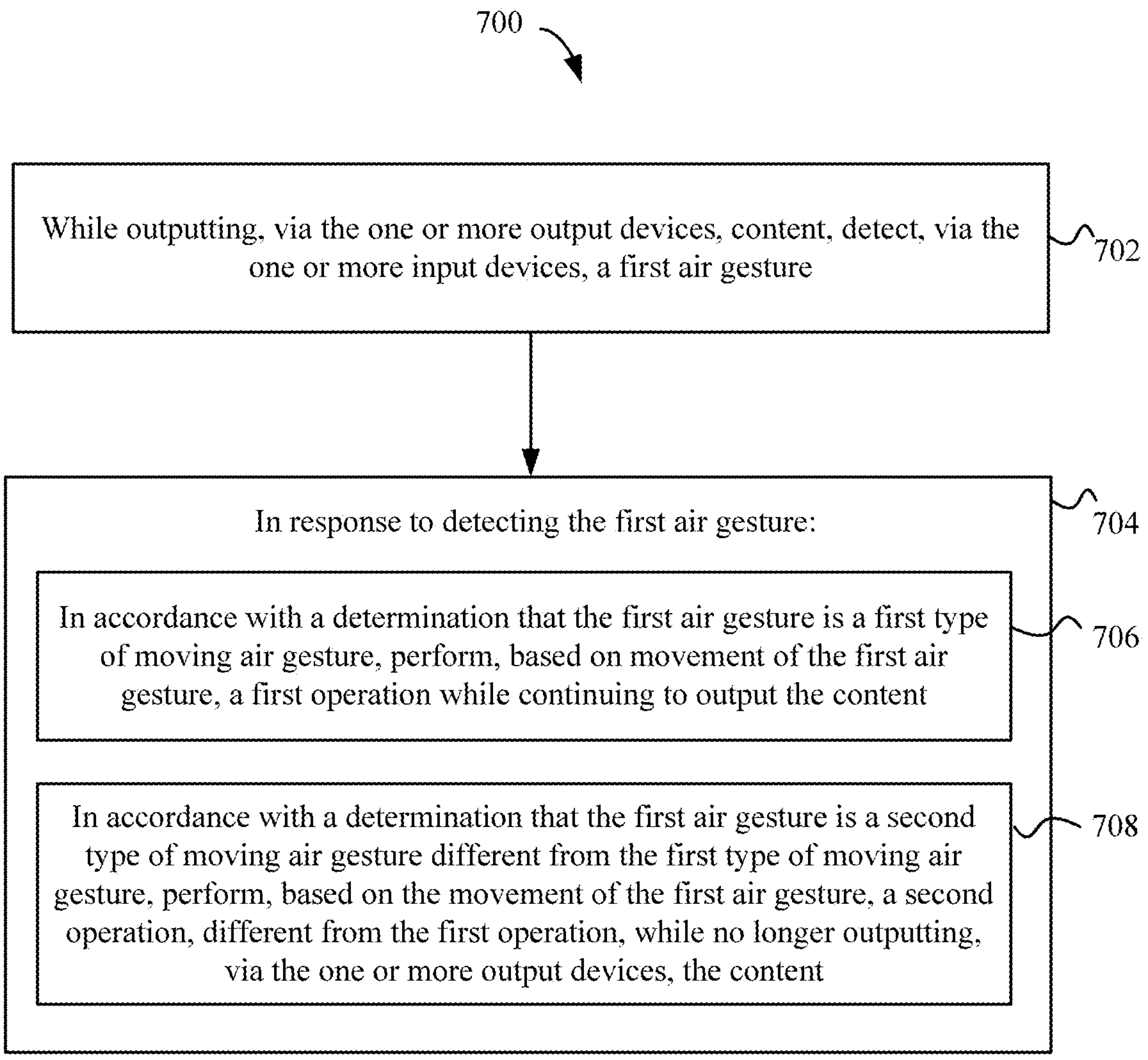
FIG. 7 is a flow diagram illustrating a method for responding to different types of air gestures in accordance with some embodiments.

As illustrated in FIG. 6A, the second person (e.g., second user 210) is in an environment including computer system 200, which displays music user interface 602. In some embodiments, music user interface 602 is a user interface of a music application executing on computer system 200. It should be recognized that other user interfaces can be displayed by computer system 200 while using techniques described herein and that music user interface 602 is used for discussion purposes.

As illustrated in FIG. 6A, music user interface 602 includes an identification of a song (e.g., title 604) and a set of controls (e.g., controls 606) for controlling output of computer system 200 with respect to music user interface 602. In some embodiments, controls 606 include (1) a virtual button (e.g., previous button 608A) for restarting a current song being acoustically output and/or changing a current song being acoustically output to a previous song (e.g., depending on whether a portion of the current song being currently output is within a predefined amount of the beginning of the current song) (and/or change music user interface 602 to correspond to the previous song), (2) a virtual button (e.g., next button 604B) for changing the current song being acoustically output to a next song (and/or change music user interface 602 to correspond to the next song), and (3) a virtual button (e.g., pause button 608C) for pausing audio output of the current song. In some embodiments, music user interface 602 includes pause button 608 while computer system 200 is acoustically outputting (e.g., via one or more speakers of and/or in communication with computer system 200) media, such as media corresponding to the current song (e.g., a first song, as illustrated with indication 610). In some embodiments, music user interface 602 includes a play button (e.g., play button 616, as illustrated in FIG. 6D) while computer system 200 is not acoustically outputting (e.g., via one or more speakers of and/or in communication with computer system 200) media corresponding to music user interface 602. It should be recognized that such controls described above are merely examples of some controls that can be displayed and that more, fewer, and/or different controls can be displayed in music user interface 602. In some embodiments, indication 610 is not displayed by computer system 200 but rather used as a visual indication of what song is playing for discussion purposes herein.

At FIG. 6A, second user 210 performs a fourth type of air gesture (e.g., a flick gesture) in a left direction relative to second user 210. In some embodiments, the flick gesture is an air gesture where a user extends a single finger and moves the finger from a first position (e.g., location and/or orientation) to a second position different from the first position. In some embodiments, the flick gesture is a moving air gesture that is completed (e.g., the single finger comes to a stop and/or is no longer extended) within a predefined period of time. In some embodiments, the flick gesture is a moving air gesture that includes an upward and/or downward portion that is greater than a lateral (e.g., left and/or right) portion of the moving air gesture. In some embodiments, the flick gesture is a moving air gesture that includes movement of the single finger but less than a threshold amount of movement of a hand including the single finger. In some embodiments, the flick gesture is a moving air gesture that includes less movement (e.g., covers less distance while moving) than a threshold amount of movement. In some embodiments, one or more operations performed in response to the flick air gesture depend on a direction of the flick gesture (e.g., the flick gesture in one direction can cause a first operation, and the flick gesture in another direction can cause a second operation different than the first operation). For example, the flick gesture in the right direction (e.g., more to the right direction than to the left direction and/or more to the right direction than another direction) can cause computer system 200 to change what song is acoustically output to a next song while the flick gesture in the left direction (e.g., more to the left direction than to the right direction and/or more to the left direction than another direction) can cause computer system 200 to change what song is acoustically output to a previous song. It should be recognized that a flick gesture can include a different movement and/or position than explicitly described in this paragraph. At FIG. 6A, computer system 200 detects the flick gesture in the left direction.

Figure 6B:
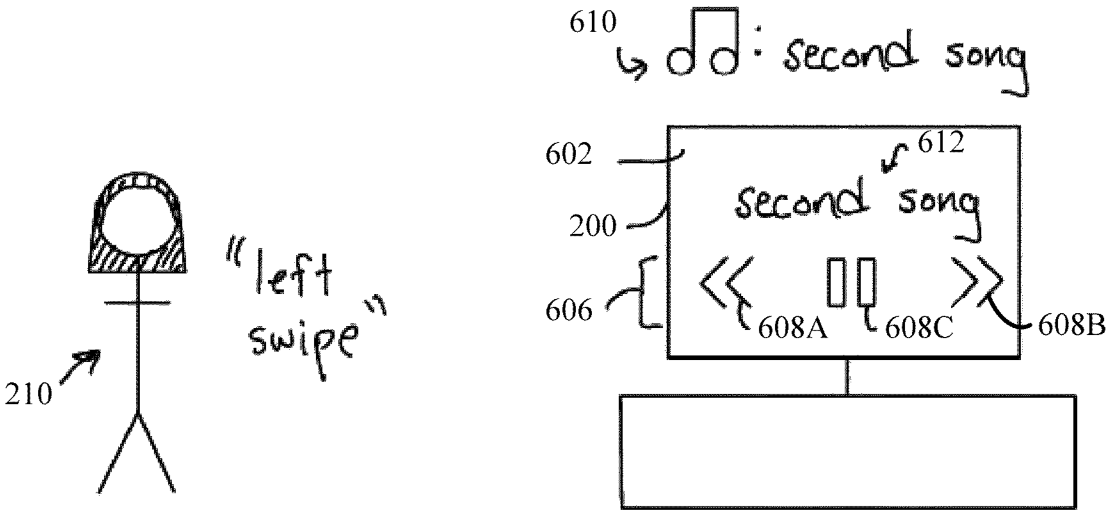

As illustrated in FIG. 6B, in response to detecting the flick gesture in the left direction, computer system 200 (1) ceases displaying portions of music user interface 602 that correspond to the first song, (2) displays portions of music user interface 602 that correspond to a next song (e.g., a second song, as illustrated by title 612), (3) maintains displaying controls 606, and (4) acoustically outputs the second song instead of the first song (e.g., as illustrated by indication 610 in FIG. 6B). In some embodiments, controls 606 as illustrated in FIG. 6B correspond to a current song that is being acoustically output (e.g., the second song) and function as described about with respect to FIG. 6A (e.g., selection of next button 604B causes a song after the second song to be acoustically output while displaying portions corresponding to the song in music user interface 602). It should be recognized that changing portions of music user interface 602 and changing what song is output is just one example of operations performed in response to detecting the flick gesture in the left direction.

Figure 6C:
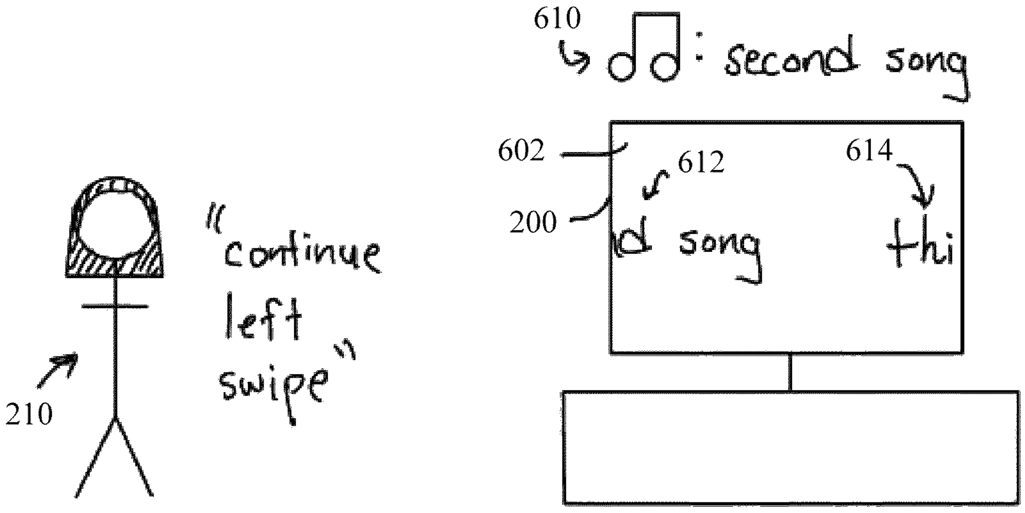
Figure 6D:
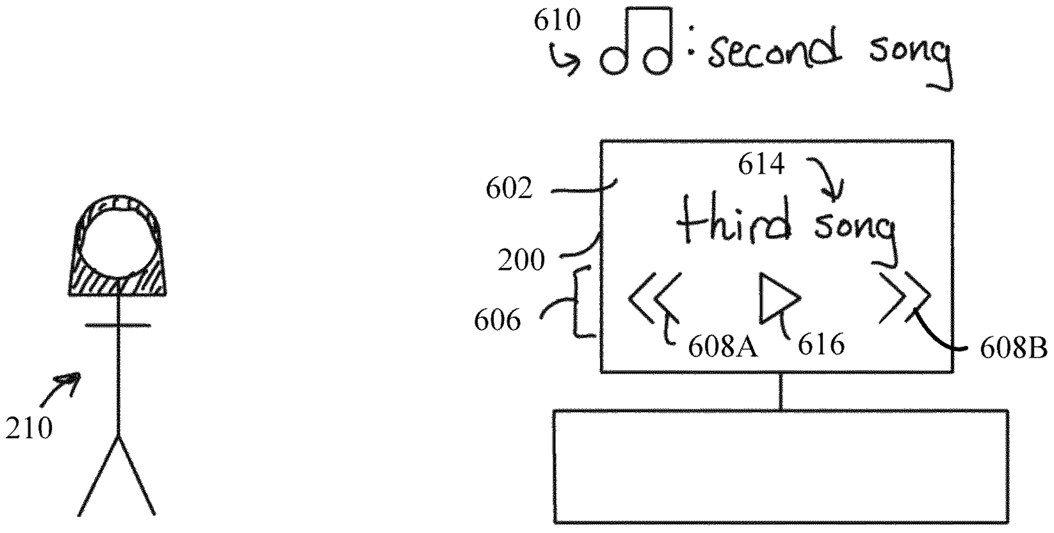

At FIG. 6B, second user 210 performs a fifth type of air gesture (e.g., a swipe gesture) in a left direction (e.g., same direction as the flick gesture in FIG. 6A) relative to second user 210. In some embodiments, the swipe gesture is an air gesture where a user extends a single finger and moves the finger from a first position (e.g., location and/or orientation) to a second position different from the first position. In some embodiments, the swipe gesture is a moving air gesture that is completed (e.g., the single finger comes to a stop and/or is no longer extended) in longer than the predefined period of time that is defined for the flick gesture. In some embodiments, the swipe gesture is a moving air gesture that includes a lateral (e.g., left and/or right) portion that is greater than an upward and/or downward portion of the moving air gesture. In some embodiments, the swipe gesture is a moving air gesture that includes movement of the single finger and more than the threshold amount of movement of a hand including the single finger. In some embodiments, the swipe gesture is a moving air gesture that includes more movement (e.g., covers more distance while moving) than the threshold amount of movement defined for the flick gesture. In some embodiments, one or more operations performed in response to the swipe air gesture depend on a direction of the swipe gesture (e.g., the swipe gesture in one direction can cause a first operation, and the swipe gesture in another direction can cause a second operation different than the first operation). For example, the swipe gesture in the right direction (e.g., more to the right direction than to the left direction and/or more to the right direction than another direction) can cause computer system 200 to change what content is visually output to correspond a next song while the swipe gesture in the left direction (e.g., more to the left direction than to the right direction and/or more to the left direction than another direction) can cause computer system 200 to change what content is visually output to correspond to a previous song or vice versa. In some embodiments, a particular swipe gesture in a particular direction has an opposite effect with respect to direction as a particular flick gesture in the particular direction. For example, a swipe gesture to the left can proceed to the right (e.g., a next song) in a list while a flick gesture to the left can proceed to the left (e.g., a previous song) in the list. In some embodiments, swipe gestures cause an operation that tracks and/or follows the swipe gestures to be performed (e.g., as described below with respect to FIGS. 6C-6D, such as display an intermediate frame (e.g., as illustrated in FIG. 6C) before detecting an end of a particular swipe gesture) while flick gestures cause a binary operation to be performed (e.g., as described above with respect to FIGS. 6A-6B, such as display another user interface and/or user-interface element without displaying an intermediate frame before detecting an end of a particular flick gesture). It should be recognized that a swipe gesture can include a different movement and/or position than explicitly described in this paragraph. At FIG. 6B, computer system 200 detects the swipe gesture in the left direction.

At FIG. 6C, in response to detecting the swipe gesture in the left direction and while still detecting the swipe gesture, computer system 200 (1) ceases displaying portions of music user interface 602 (e.g., previous button 608A, next button 604B, pause button 608C, and/or a portion of title 612), (2) displays portions of music user interface 602 that correspond to a next song (e.g., a third song, as illustrated by a portion of title 614), and (3) continues acoustically outputting the second song instead of initiating acoustically outputting the third song (e.g., as illustrated by indication 610 in FIG. 6C). It should be recognized that changing portions of music user interface 602 and continuing outputting a song is just one example of operations performed in response to detecting the swipe gesture in the left direction.

At FIG. 6C, second user 210 continues performing the fifth type of air gesture (e.g., the swipe gesture) in the left direction relative to second user 210. For example, between FIG. 6B and FIG. 6C, second user 210 has not ended the swipe gesture and has instead maintained an orientation (e.g., of the single finger) that is determined to be the swipe gesture. At FIG. 6C, computer system 200 detects the swipe gesture continuing in the left direction.

As illustrated in FIG. 6D, in response to detecting end of the swipe gesture (e.g., as discussed above with respect to FIGS. 6B-6C), computer system 200 (1) ceases displaying portions of music user interface 602 that correspond to the second song, (2) displays portions of music user interface 602 that correspond to the next song (e.g., the third song, as illustrated by title 614), (3) displays controls 606, and (4) continues acoustically outputting the second song instead of initiating acoustically outputting the third song (e.g., as illustrated by indication 610 in FIG. 6D). In some embodiments while displaying a different song than is being acoustically output (e.g., as illustrated in FIG. 6D), inputs detected via one or more controls of controls 606 is with respect to a song that is being output (e.g., the second song in FIG. 6D even though title 614 corresponds to the third song) while inputs detected via one or more other controls of controls 606 is with respect to a song corresponding to title 614. For example, an input directed to previous button 608A and/or next button 604B in FIG. 6D can cause computer system 200 to react as described above with respect to FIG. 6A. In some embodiments while displaying a different song than is being acoustically output (e.g., as illustrated in FIG. 6D), an input detected via a control of controls 606 changes functionality as described above with respect to FIG. 6A. For example, an input directed to previous button 608A and/or next button 604B in FIG. 6D can cause computer system 200 to display portions of music user interface 602 that correspond to a previous or next song, respectively, without displaying portions of music user interface 602 that correspond to the third song. In some embodiments, an input directed to play button 616 causes computer system 200 to cease acoustically outputting the second song and initiate acoustically outputting a current song being displayed (e.g., the third song). In some embodiments, more, less, and/or different controls can be displayed in controls 606 at FIG. 6D. For example, music user interface 602 can include play button 616 but not previous button 608A and/or next button 608B. It should be recognized that changing portions of music user interface 602 while not changing what song is output is just one example of operations performed in response to detecting the swipe gesture in the left direction.

While the above description includes different criteria for differentiating swipe gestures and flick gestures, it should be recognized that different users (e.g., people) can have different criteria for differentiating swipe gestures and flick gestures. For example, different users can have different predefined periods of time defined for a flick gesture, different amounts of lateral, upward, and/or downward portions required to be a flick gesture, and/or different threshold amounts of movement for a flick gesture. Such different criteria can be learned through use by the different users and/or defined by the different users.

FIG. 7 is a flow diagram illustrating a method (e.g., method 700) for responding to different types of air gestures in accordance with some embodiments. Some operations in method 700 are, optionally, combined, the orders of some operations are, optionally, changed, and some operations are, optionally, omitted.

As described below, method 700 provides an intuitive way for responding to different types of air gestures. Method 700 reduces the cognitive burden on a user for using air gestures, thereby creating a more efficient human-machine interface. For battery-operated computing devices, enabling a user to use air gestures to perform tasks faster and more efficiently conserves power and increases the time between battery charges.

In some embodiments, method 700 is performed at a computer system (e.g., 100, 200, and/or another computer system) that is in communication with one or more input devices (e.g., a camera, a depth sensor, and/or a microphone) and one or more output devices (e.g., a display generation component, an audio generation component, a speaker, a haptic output device, a display screen, a projector, and/or a touch-sensitive display). In some embodiments, the computer system is an accessory, a controller, a fitness tracking device, a watch, a phone, a tablet, a processor, a head-mounted display (HMD) device, and/or a personal computing device.

While outputting, via the one or more output devices, content (e.g., movies, music, podcasts, audio, video, and/or images) (e.g., the second song, 612, 604A, 604B, 604C, and/or 602, as described above with respect to FIG. 6B), the computer system detects (702), via the one or more input devices, a first air gesture (e.g., the left flick gesture as described above with respect to FIG. 6A or the left swipe gesture as described above with respect to FIGS. 6B-6C) (e.g., a hand gesture to pick up, a hand gesture to press, an air tap, an air swipe, and/or a clench-and-hold air gesture). In some embodiments, the computer system outputs, via the one or more output devices, the content. In some embodiments, instead of an air gesture (e.g., the first air gesture), an input (e.g., a first input) is detected via a touch-sensitive surface.

In response to (704) detecting the first air gesture, in accordance with a determination that the first air gesture is a first type of moving air gesture (e.g., a swipe gesture) (e.g., a swipe gesture, a select-move-and-release gesture, and/or a slide gesture) (and/or that the first air gesture was performed in more than a threshold amount of time) (and/or that the first air gesture traveled more than a threshold amount of distance) (and/or that the first air gesture includes less than a threshold amount of movement in a first direction (e.g., a vertical and/or y direction)) (e.g., a flick gesture, a select-quick-move-and-release gesture, a quick swipe gesture, and/or a quick slide gesture) (and/or that the first air gesture was performed in less than a threshold amount of time) (and/or that the first air gesture traveled less than a threshold amount of distance) (and/or that the first air gesture includes more than a threshold amount of movement in a first direction (e.g., a vertical and/or y direction)), the computer system performs (706), based on movement of the first air gesture, a first operation (e.g., displays 604A, 604B, 616, and/or a portion of 614 and/or changes which song is displayed, as described above with respect to FIG. 6D) while continuing to output the content (e.g., the second song, as described above with respect to FIG. 6D).

In response to (704) detecting the first air gesture, in accordance with a determination that the first air gesture is a second type of moving air gesture (e.g., a flick gesture) different from the first type of moving air gesture (e.g., a flick gesture, a select-quick-move-and-release gesture, a quick swipe gesture, and/or a quick slide gesture) (and/or that the first air gesture was performed in less than a threshold amount of time) (and/or that the first air gesture traveled less than a threshold amount of distance) (and/or that the first air gesture includes more than a threshold amount of movement in a first direction (e.g., a vertical and/or y direction)) (e.g., a swipe gesture, a select-move-and-release gesture, and/or a slide gesture) (and/or that the first air gesture was performed in more than a threshold amount of time) (and/or that the first air gesture traveled more than a threshold amount of distance) (and/or that the first air gesture includes less than a threshold amount of movement in a first direction (e.g., a vertical and/or y direction)), the computer system performs (708), based on the movement of the first air gesture, a second operation (e.g., displays 604A, 604B, 604C, and/or 612 and/or changes which song is displayed, as described above with respect to FIG. 6B), different from the first operation, while no longer outputting, via the one or more output devices, the content (e.g., the first song as described above with respect to FIG. 6A). In some embodiments, in response to detecting the first air gesture and in accordance with a determination that the first air gesture is the second type of moving air gesture, the computer system ceases outputting, via the one or more output devices, the content (e.g., 604, 604A, 604B, and/or 604C). Performing a first operation while continuing to output content in accordance with a determination that a first air gesture is a first type of moving air gesture and performing a second operation while no longer outputting the content in accordance with a determination that the first air gesture is a second type of moving air gesture enables (1) a user to interact with what is being output differently depending on what type of air gesture is performed and/or (2) a computer system to base some operations on speed of an air gesture (e.g., the first operation or the second operation) while other operations are not based on the speed (e.g., continuing to output or forgoing outputting the content), thereby performing an operation when a set of conditions has been met without requiring further user input and/or providing improved visual feedback to the user.

In some embodiments, the first air gesture (e.g., is performed by a user) moves from a first position to a second position different from the first position (e.g., a portion (e.g., arm, hand, and/or finger) of the user, a stylist, and/or an electronic device performing the first air gesture moves from the first position to the second position) (e.g., the portion of the user performing the first air gesture is initially targeting the first position at the beginning of the first air gesture and moves to targeting the second position at another point (e.g., the end) in the first air gesture). The first air gesture moving from a first position to a second position enables a computer system to differentiate between two different gestures without requiring an input of another type, thereby performing an operation when a set of conditions has been met without requiring further user input and/or reducing the number of inputs needed to perform an operation.

In some embodiments, the one or more output devices includes a first display generation component (e.g., a display screen, a projector, and/or a touch-sensitive display). In some embodiments, outputting the content includes displaying, via the first display generation component, visual content (e.g., images, graphics, and/or album art) (e.g., 604, 612, 604A, 604B, 604C, and/or a background of 602) corresponding to the content. Outputting the content including displaying visual content corresponding to the content enables a computer system to provide visual content to a user as feedback for input performed by the user, thereby performing an operation when a set of conditions has been met without requiring further user input and/or providing improved visual feedback to the user.

In some embodiments, the one or more output devices includes a first audio generation component (e.g., smart speaker, home theater system, soundbars, headphones, earphone, earbud, speaker, television speaker, augmented reality headset speaker, audio jack, optical audio output, Bluetooth audio outputs, HDMI audio outputs, and/or audio sensor). In some embodiments, outputting the content includes outputting, via the first audio generation component, first audio content (e.g., song, track, audiobook, and/or audio file) (e.g., the first song and/or the second song, as described above with respect to FIGS. 6A-6B) corresponding to the content. Outputting first audio content corresponding to the content enables a computer system to provide audio content to a user as feedback for input performed by the user, thereby providing improved feedback to the user and/or performing an operation when a set of conditions has been met without requiring further user input.

In some embodiments, the one or more output devices includes a second display generation component (e.g., a display screen, a projector, and/or a touch-sensitive display). In some embodiments, while outputting, via the first audio generation component, the first audio content corresponding to the content, the computer system displays, via the second display generation component, a second visual content (e.g., 604, 606, 604A, 604B, 604C, 612, 614, and/or 616) corresponding to the content. In some embodiments, the second display generation component is different from the first display generation component. While outputting the first audio content corresponding to the content, displaying a second visual content corresponding to the content enables a computer system to provide a user with multiple forms of content, thereby providing improved feedback to the user and/or performing an operation when a set of conditions has been met without requiring further user input.

In some embodiments, the one or more output devices includes a third display generation component (e.g., a display screen, a projector, and/or a touch-sensitive display). In some embodiments, after (and/or in response to) ceasing outputting, via the first audio generation component, the first audio content corresponding to the content, the computer system displays, via the third display generation component, a third visual content (e.g., 612) corresponding to the content. In some embodiments, the third display generation component is different from the first display generation component. In some embodiments, the third visual content is not displayed before ceasing outputting the first audio content. In some embodiments, the third visual content is displayed as a result of outputting the first audio content. In some embodiments, the third visual content corresponds to and/or is associated with the first audio content. In some embodiments, visual content is not initially displayed (e.g., via the third display generation component) (e.g., display of new visual content is not caused to be displayed for the first time) while outputting the content and/or the first audio content. After ceasing outputting the first audio content corresponding to the content, displaying a third visual content corresponding to the content enables a computer system to provide a user with multiple forms of content in an iterative manner, thereby providing improved feedback to the user and/or reducing the number of inputs needed to perform an operation.

In some embodiments, the one or more input devices includes one or more cameras (e.g., a telephoto camera, a wide-angle camera, and/or an ultra-wide-angle camera). In some embodiments, detecting the first air gesture is performed via the one or more cameras (e.g., one or more images are captured by the one or more cameras and the computer system identifies the first air gesture in the one or more images). Detecting the first air gesture via one or more cameras enables a computer system to detect a variety of inputs by a user including movements than can occur at more of a distance from the computer system, thereby providing improved feedback to the user and/or performing an operation when a set of conditions has been met without requiring further user input.

In some embodiments, the determination that the first air gesture is the first type of moving air gesture includes a determination that the first air gesture is performed for more than a threshold amount of time (e.g., 1-5 seconds) (e.g., that the first air gesture is maintained for more than the threshold amount of time). The determination that the first air gesture is the first type of moving air gesture including a determination that the first air gesture is performed for more than a threshold amount of time enables a computer system to avoid unintentional inputs by a user, thereby providing reducing the number of inputs needed to perform an operation, providing improved feedback to the user, and/or increasing security.

In some embodiments, the determination that the first air gesture is the first type of moving air gesture includes a determination that the first air gesture moves more than a threshold amount of distance (e.g., 1-5 inches) (e.g., that the first air gesture was not an accidental movement). The determination that the first air gesture is the first type of moving air gesture including a determination that the first air gesture moves more than a threshold amount of distance enables a computer system to avoid unintentional inputs by a user, thereby providing reducing the number of inputs needed to perform an operation, providing improved feedback to the user, and/or increasing security.

In some embodiments, the determination that the first air gesture is the first type of moving air gesture includes a determination that the first air gesture includes a movement having less than a threshold amount of movement in a first direction (e.g., a vertical and/or y direction). The determination that the first air gesture is the first type of moving air gesture including a determination that the first air gesture includes a movement having less than a threshold amount of movement in a first direction enables a computer system to avoid unintentional inputs by a user, thereby providing reducing the number of inputs needed to perform an operation, providing improved feedback to the user, and/or increasing security.

In some embodiments, while outputting, via the one or more output devices, the content, the computer system detects, via the one or more input devices, an input (e.g., a non-air gesture input, such as a tap input and/or a non-tap input (e.g., a verbal input, an audible request, an audible command, an audible statement, a swipe input, a hold-and-drag input, a gaze input, and/or a mouse click)) that is a different type (e.g., mouse input, touchpad input, and/or keyboard input) of input than the first air gesture. In some embodiments, in response to detecting the input, the computer system ceases outputting, via the one or more output devices, the content. Ceasing outputting the content in response to detecting a different type of input than the first type of input enables a computer system multiple types of air gestures to stop outputting the content (e.g., some with more or less functionality than others), thereby reducing the number of inputs needed to perform an operation and/or providing improved visual feedback to the user.

In some embodiments, performing the second operation includes outputting, via the one or more output device, new content (e.g., audio, images, songs, and/or video not output during the first operation) different from the content. In some embodiments, the new content (e.g., song and/or track) is related to, corresponding to, and/or associated with the content (e.g., song and/or track) such as another song from the same album and/or another song from the same playlist. Performing the second operation including outputting new content different from the content enables a computer system to update what is output based on air gestures, thereby performing an operation when a set of conditions has been met without requiring further user input, reducing the number of inputs needed to perform an operation, and/or providing improved feedback to the user.

In some embodiments, the new content (e.g., image, songs, and/or video) includes a second audio content (e.g., next or previous track in an album and/or playlist) (e.g., the second song and/or the third song) corresponding to the new content. In some embodiments, the content does not include the second audio content. The new content including a second audio content corresponding to the new content enables a computer system to allow a user to switch between different content using air gestures, thereby performing an operation when a set of conditions has been met without requiring further user input, reducing the number of inputs needed to perform an operation, and/or providing improved feedback to the user.

In some embodiments, the one or more output devices includes a fourth display generation component. In some embodiments, performing the second operation includes displaying, via the fourth display generation component, a third visual content different from the content. Performing the second operation including displaying a third visual content different from the content enables a computer system to allow a user to switch between different content using air gestures, thereby performing an operation when a set of conditions has been met without requiring further user input and/or providing improved visual feedback to the user.

In some embodiments, the one or more output devices includes a fifth display generation component. In some embodiments, performing the first operation includes displaying, via the fifth display generation component, a fourth visual content (e.g., 614, 604A, 604B, and/or 616) different from the content. Performing the first operation includes displaying a fourth visual content different from the content enables a computer system to allow a user to access different types of content, thereby performing an operation when a set of conditions has been met without requiring further user input and/or providing improved visual feedback to the user.

In some embodiments, outputting, via the one or more output devices, the content includes displaying, via the sixth display generation component, a fifth visual content (e.g., at least a portion of 612, as described above with respect to FIGS. 6B-6C) corresponding to the content. In some embodiments, while detecting the first air gesture, the computer system continues (and/or maintains) displaying, via the sixth display generation component, the fifth visual content. In some embodiments, while detecting the first air gesture, the computer system displays, via the sixth display generation component, a sixth visual content (e.g., at least a portion of 614, as described above with respect to FIG. 6C) along with (and/or while displaying) the content, wherein the sixth visual content is not displayed before detecting the first air gesture. In some embodiments, while detecting the first air gesture, the computer system concurrently displays (1) the content and (2) the sixth visual content. While detecting the first air gesture, continuing displaying the content and displaying a sixth visual content along with the content enables a computer system to continue to display content to ground a user in what is being shown while still showing new content, thereby reducing the number of inputs needed to perform an operation and/or providing improved visual feedback to the user.

In some embodiments, the first operation is performed based on a distance (e.g., 1-20 inches) of the movement of the first air gesture (e.g., the first operation is performed in a different manner depending on the distance of the movement of the first air gesture, such that the first operation is performed in a first manner when the distance is a first distance and in a second manner when the distance is a second distance different from the first distance) (e.g., to determine what song to display, shorter distances cause less songs to be skipped in a playlist while longer distances cause more songs to be skipped in the playlist). In some embodiments, the second operation is performed based on the distance of the movement of the first air gesture (e.g., the second operation is performed in a different manner depending on the distance of the movement of the first air gesture, such that the second operation is performed in a third manner when the distance is a third distance and in a fourth manner when the distance is a fourth distance different from the third distance) (e.g., to determine what song to audibly output, shorter distances cause less songs to be skipped in the playlist while longer distances cause more songs to be skipped in the playlist). The first operation being performed based on a distance of the movement of the first air gesture enables a computer system to provide fine-grained control to operations depending on the distance of the movement of the first air gesture, thereby providing reducing the number of inputs needed to perform an operation, providing improved feedback to the user, and/or increasing security.

In some embodiments, the second operation is performed based on a speed (e.g., 1-3 inch per second) (and/or acceleration (e.g., 1-3 inch per second)) of the movement of the first air gesture (e.g., the first operation is performed in a different manner depending on the speed of the movement of the first air gesture, such that the first operation is performed in a first manner when the speed is a first speed (and/or the acceleration is a first acceleration) and in a second manner when the speed is a second speed different from the first speed (and/or the acceleration is a second acceleration different from the first acceleration)) (e.g., to determine what song to display, shorter distances cause less songs to be skipped in a playlist while longer distances cause more songs to be skipped in the playlist). In some embodiments, the first operation is performed based on the speed of the movement of the first air gesture. The second operation being performed based on a speed of the movement of the first air gesture enables a computer system to provide fine-grained control to operations depending on the speed of the movement of the first air gesture, thereby providing reducing the number of inputs needed to perform an operation, providing improved feedback to the user, and/or increasing security.

In some embodiments, the content is first content. In some embodiments, while outputting, via the one or more output devices, second content (e.g., different from the first content), the computer system detects, via the one or more input devices, a second air gesture (e.g., before or after detecting the first air gesture). In some embodiments, in response to detecting the second air gesture, in accordance with a determination that the second air gesture corresponds to a first user (e.g., a user, a person, an animal, and/or an electronic device) (and/or that the first user has established that, in accordance with a determination that the first type of moving air gesture is performed, the computer system performs the first operation), the computer system performs, based on movement of the second air gesture, the first operation while continuing to output the second content. In some embodiments, in response to detecting the second air gesture, in accordance with a determination that the second air gesture corresponds to a second user different from the first user (and/or that the second user has established that, in accordance with a determination that the first type of moving air gesture is performed, the computer system performs the second operation), the computer system performs, based on the movement of the second air gesture, the second operation while no longer outputting, via the one or more output devices, the second content. Performing the first operation while continuing to output the second content in accordance with a determination that the second air gesture corresponds to a first user and performing the second operation while no longer outputting the second operation in accordance with a determination that the second air gesture corresponds to a second user enables a computer system to cater different air gestures to different users such that the same air gesture causes different outcomes depending on who performed the air gesture, thereby performing an operation when a set of conditions has been met without requiring further user input and/or providing improved feedback to the user.

In some embodiments, the content is third content. In some embodiments, while outputting, via the one or more output devices, fourth content (e.g., different from the first content), the computer system detects, via the one or more input devices, a third air gesture (e.g., before or after detecting the first air gesture). In some embodiments, in response to detecting the third air gesture, in accordance with a determination that the third air gesture corresponds to a first application (and/or that the first application is currently active (e.g., a user interface of the first application is currently being displayed) (e.g., via the computer system)) and that the third gesture is a third type of moving gesture, the computer system performs (e.g., via the first application and/or another application different from the first application) (e.g., based on movement of the third air gesture) a third operation (e.g., while continuing to output the fourth content or while no longer outputting, via the one or more output devices, the fourth content). In some embodiments, in response to detecting the third air gesture, in accordance with a determination that the third air gesture corresponds to the first application and that the third gesture is a fourth type of moving gesture different from the third type of moving gesture, the computer system performs (e.g., via the first application and/or another application different from the first application) (e.g., based on the movement of the third air gesture) a fourth operation different from the third operation (e.g., while continuing to output the fourth content or while no longer outputting, via the one or more output devices, the fourth content). In some embodiments, in response to detecting the third air gesture, in accordance with a determination that the third air gesture corresponds to a second application different from the first application and that the third gesture is the third type of moving gesture, the computer system performs (e.g., via the second application and/or another application different from the second application) (e.g., based on the movement of the third air gesture) a fifth operation different from the third operation (and/or different from the fourth operation) (e.g., while continuing to output the fourth content or while no longer outputting, via the one or more output devices, the fourth content). In some embodiments, in response to detecting the third air gesture, in accordance with a determination that the third air gesture corresponds to the second application and that the third gesture is the fourth type of moving gesture, the computer system performs (e.g., via the second application and/or another application different from the second application) (e.g., based on the movement of the third air gesture) a sixth operation different from the fifth operation and the fourth operation (and/or different from the third operation) (e.g., while continuing to output the fourth content or while no longer outputting, via the one or more output devices, the fourth content). In some embodiments, the third type of moving air gesture corresponds to the fourth operation (e.g., play next song, fast forward, and/or pause) for the first application (e.g., music application, podcast application and/or video application) and the third type of moving air gesture corresponds to the fifth operation (e.g., play next song, fast forward, and/or pause) for the second application (e.g., music application, podcast application and/or video application). Performing a third operation in accordance with a determination that the third air gesture corresponds to a first application and that the third gesture is a third type of moving gesture and performing a fifth operation in accordance with a determination that the third air gesture corresponds to a second application different and that the third gesture is the third type of moving gesture enables a computer system to respond differently to the same air gesture depending on which application is being used, thereby performing an operation when a set of conditions has been met without requiring further user input and/or providing improved visual feedback to the user.

Note that details of the processes described above with respect to method 700 (e.g., FIG. 7) are also applicable in an analogous manner to the methods described herein. For example, method 300 optionally includes one or more of the characteristics of the various methods described above with reference to method 700. For example, the first operation of method 300 can be the first operation and/or the second operation of method 700. For brevity, these details are not repeated below.

The operations described above can be performed using various ecosystems of devices. Conceptually, a source device obtains and delivers data representing the environment to a decision controller. In the foregoing examples, for instance, an accessory device in the form of a camera acts as a source device by providing camera output about the environments described above with respect to FIGS. 2A-2E, 3, 4A-4C, 5, 6A-6D, and/or 7. The camera output can be provided to a controller device with sufficient computation power to process the incoming information and generate instructions for other devices in the environment. Examples of electronic devices having sufficient computational power to act as controllers include a smart phone, a smart watch, a smart display, a tablet, a laptop, and/or a desktop computer. Controller functionality may also be integrated into devices that have other primary functionalities, such as a media playback device, a smart speaker, a tabletop dock or smart screen, and/or a television. Source devices, such as the camera, can in some instances have sufficient computational power to act as controller devices. It should be appreciated that computational power generally represents a design choice that is balanced with power consumption, packaging, and/or cost. For example, a source device that is wired to main electricity may be more likely to take on controller device functionality than a battery-powered device, even though both are possible. The controller device, upon determining a decision based on the obtained sensor output, provides instructions to be processed by one or more other devices in the environment (e.g., computer system 200). In the foregoing examples, the controller device causes computer system 200 to display different content.

The various ecosystems of devices described above can connect and communicate with one another using various communication configurations. Some exemplary configurations involve direct communications such as device-to-device connections. For example, a source device (e.g., camera) can capture images of an environment, determine an air gesture performed by a particular user and, acting as a controller device, determine to send an instruction to a computer system to change states. The connection between the source device and the computer system can be wired or wireless. The connection can be a direct device-to-device connection such as Bluetooth. Some exemplary configurations involve mesh connections. For example, a source device may use a mesh connection such as Thread to connect with other devices in the environment. Some exemplary configurations involve local and/or wide area networks and may employ a combination of wired (e.g., Ethernet) and wireless (e.g., Wi-Fi, Bluetooth, Thread, and/or UWB) connections. For example, a camera may connect locally with a controller hub in the form of a smart speaker, and the smart speaker may relay instructions remotely with a smart phone, over a cellular or Internet connection.

As described above, the present technology contemplates the gathering and use of data available from various sources, including cameras, to improve interactions with connected devices. In some instances, these sources may include electronic devices situated in an enclosed space such as a room, a home, a building, and/or a predefined area. Cameras and other connected, smart devices offer potential benefit to users. For example, security systems often incorporate cameras and other sensors. Accordingly, the use of smart devices enables users to have calculated control of benefits, include detecting air gestures, in their environment. Other uses for sensor data that benefit the user are also contemplated by the present disclosure. For instance, health data may be used to provide insights into a user's general wellness.

Entities responsible for implementing, collecting, analyzing, disclosing, transferring, storing, or otherwise using camera images or other data containing personal information should comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, camera images or personal information data. For example, in the case of device control services, the present technology can be configured to allow users to select to "opt in" or "opt out" of participation during registration for services or anytime thereafter. In another example, users can selectively enable certain device control services while disabling others. For example, a user may enable detecting air gestures with depth sensors but disable camera output.

Implementers may also take steps to anonymize sensor data. For example, cameras may operate at low resolution for automatic object detection, and capture at higher resolutions upon explicit user instruction. Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., name and location), controlling the amount or specificity of data stored (e.g., collecting location data a city level rather than at an address level), controlling how data is stored (e.g., aggregating data across users), and/or other methods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method, comprising:

at a computer system that is in communication with one or more input devices, one or more display generation components, and one or more audio generation components:

while outputting, via the one or more audio generation components, first content, detecting, via the one or more input devices, a first air gesture; and in response to detecting the first air gesture:

in accordance with a determination that the first air gesture is a first type of moving air gesture and that the first air gesture is in a first direction, displaying, via the one or more display generation components, visual content corresponding to second content that is next after the first content while continuing to output the first content and without outputting, via the one or more audio generation components, the second content, wherein the second content is different from the first content; and in accordance with a determination that the first air gesture is the first type of moving air gesture and that the first air gesture is in a second direction, displaying, via the one or more display generation components, visual content corresponding to third content that is before the first content while continuing to output the first content and without outputting, via the one or more audio generation components, the third content, wherein the third content is different from the second content and the first content.

2. The method of claim 1, wherein, in accordance with a determination that the first air gesture is in the first direction, the first air gesture moves from a first position to a second position different from the first position, and wherein, in accordance with a determination that the first air gesture is in the second direction, the first air gesture moves from a third position to a fourth position different from the third position.

3. The method of claim 1, further comprising:

in conjunction with outputting the first content, displaying, via the one or more display generation components, visual content corresponding to the first content, wherein the visual content corresponding to the first content is displayed while detecting initiation of the first air gesture.

4. The method of claim 3, further comprising:

in response to detecting the first air gesture, ceasing display of, via the one or more third display generation components, the visual content corresponding to the first content.

5. The method of claim 1, wherein the one or more input devices includes one or more cameras, and wherein the first air gesture is detected via the one or more cameras.

6. The method of claim 1, wherein the determination that the first air gesture is the first type of moving air gesture includes a determination that the first air gesture is performed for more than a threshold amount of time.

7. The method of claim 1, wherein the determination that the first air gesture is the first type of moving air gesture includes a determination that the first air gesture moves more than a threshold amount of distance.

8. The method of claim 1, wherein the determination that the first air gesture is the first type of moving air gesture includes a determination that the first air gesture includes a movement having less than a threshold amount of movement in a third direction, and wherein the third direction is different from the first direction and the second direction.

9. The method of claim 1, further comprising:

while outputting the first content, detecting, via the one or more input devices, a non-air gesture input; and in response to detecting the non-air gesture input, ceasing output of, via the one or more audio generation components, the first content.

10. The method of claim 1, further comprising:

in response to detecting the first air gesture and in accordance with a determination that the first air gesture is a second type of moving air gesture and that the first air gesture is in the first direction, outputting, via the one or more audio generation components, the second content, wherein the second type of moving air gesture is different from the first type of moving air gesture.

11. The method of claim 10, further comprising:

in response to detecting the first air gesture and in accordance with a determination that the first air gesture is the second type of moving air gesture and that the first air gesture is in the second direction, outputting, via the one or more audio generation components, the third content.

12. The method of claim 10, further comprising:

in response to detecting the first air gesture and in accordance with the determination that the first air gesture is the second type of moving air gesture and that the first air gesture is in the first direction, displaying, via the one or more display generation components, the visual content corresponding to the second content.

13. The method of claim 10, further comprising:

in response to detecting the first air gesture and in accordance with the determination that the first air gesture is the second type of moving air gesture and that the first air gesture is in the second direction, displaying, via the one or more display generation components, the visual content corresponding to the third content.

14. The method of claim 1, further comprising:

while detecting the first air gesture and in accordance with the determination that the first air gesture is the first type of moving air gesture and that the first air gesture is in the first direction, displaying, via the one or more display generation components, at least a portion of the sixth visual content corresponding to the second content along with at least a portion of visual content corresponding to the first content, wherein the portion of the visual content corresponding to the first content is displayed before detecting the first air gesture, and wherein the portion of the visual content corresponding to the second content is not displayed before detecting the first air gesture.

15. The method of claim 14, further comprising:

while detecting the first air gesture and in accordance with a determination that the first air gesture is a second type of moving air gesture, forgoing display of any portion of the visual content corresponding to the second content, wherein the second type of moving air gesture is different from the first type of moving air gesture.

16. The method of claim 1, further comprising:

while outputting, via the one or more audio generation components, the first content, detecting, via the one or more input devices, a second air gesture; and while detecting the second air gesture and in accordance with a determination that the second air gesture is the first type of moving air gesture and that the second air gesture is in the first direction:

displaying, via the one or more display generation components, the visual content corresponding to the second content that is next after the first content while continuing to output the first content and without outputting, via the one or more audio generation components, the second content; and after displaying the visual content corresponding to the second content that is next after the first content, displaying, via the one or more display generation components, visual content corresponding to fourth content that is next after the second content while continuing to output the first content and without outputting, via the one or more audio generation components, the fourth content.

17. The method of claim 1, further comprising:

in response to detecting the first air gesture:

in accordance with a determination that the first air gesture is a second type of moving air gesture, that the second air gesture is in the first direction, and that the second air gesture is a first distance, outputting, via the one or more audio generation components, the second content, wherein the second type of moving air gesture is different from the first type of moving air gesture; and in accordance with a determination that the first air gesture is the second type of moving air gesture, that the second air gesture is in the first direction, and that the second air gesture is a second distance, outputting, via the one or more audio generation components, fourth content that is next after the second content, wherein the second distance is different from the first distance, and wherein the fourth content is different from the first content, the second content, and the third content.

18. The method of claim 1, further comprising:

while outputting, via the one or more audio generation components, the first content, detecting, via the one or more input devices, a third air gesture; and in response to detecting the third air gesture:

in accordance with a determination that the third air gesture is in the first direction and that the third air gesture is performed by a first user, displaying, via the one or more display generation components, the visual content corresponding to the second content while continuing to output the first content and without outputting, via the one or more audio generation components, the second content; and in accordance with a determination that the third air gesture is in the first direction and that the third air gesture is performed by a second user, outputting, via the one or more audio generation components, the second content, wherein the second user is different from the first user.

19. The method of claim 1, wherein the determination that the first air gesture is the first type of moving air gesture includes a determination that the first air gesture is a swipe gesture, the method further comprising:

in response to detecting the first air gesture:

in accordance with a determination that the first air gesture is a second type of moving air gesture and that the first air gesture is in the first direction, outputting, via the one or more audio generation components, the second content without outputting, via the one or more audio generation components, the first content, wherein the second direction is different from the first direction, and wherein the determination that the first air gesture is the second type of moving air gesture includes a determination that the first air gesture is a flick gesture; and in accordance with a determination that the first air gesture is the second type of moving air gesture and that the first air gesture is in the second direction, outputting, via the one or more audio generation components, the third content without outputting, via the one or more audio generation components, the first content.

20. The method of claim 19, the method further comprising:

in response to detecting the first air gesture:

in accordance with the determination that the first air gesture is the second type of moving air gesture and that the first air gesture is in the first direction, displaying, via the one or more display generation components, the visual content corresponding to the second content; and in accordance with the determination that the first air gesture is the second type of moving air gesture and that the first air gesture is in the second direction, displaying, via the one or more display generation components, the visual content corresponding to the third content.

21. The method of claim 1, further comprising:

while displaying, via the one or more display generation components, a user interface of a respective application, detecting, via the one or more input devices, a fourth air gesture; and in response to detecting the fourth air gesture:

in accordance with a determination that the fourth air gesture is the first type of moving air gesture and that the respective application is a first application, performing a first operation;

in accordance with a determination that the fourth air gesture is a second type of moving air gesture and that the respective application is the first application, performing a second operation different from the first operation, wherein the second type of moving air gesture is different from the first type of moving air gesture;

in accordance with a determination that the fourth air gesture is the first type of moving air gesture and that the respective application is a second application, performing a third operation different from the first operation; and in accordance with a determination that the fourth air gesture is the second type of moving air gesture and that the respective application is the second application, performing a fourth operation different from the second operation.

22. A non-transitory computer-readable storage medium storing one or more programs configured to be executed by one or more processors of a computer system that is in communication with one or more input devices, one or more display generation components, and one or more audio generation components, the one or more programs including instructions for:

while outputting, via the one or more audio generation components, first content, detecting, via the one or more input devices, a first air gesture; and in response to detecting the first air gesture:

in accordance with a determination that the first air gesture is a first type of moving air gesture and that the first air gesture is in a first direction, displaying, via the one or more display generation components, visual content corresponding to second content that is next after the first content while continuing to output the first content and without outputting, via the one or more audio generation components, the second content, wherein the second content is different from the first content; and in accordance with a determination that the first air gesture is the first type of moving air gesture and that the first air gesture is in a second direction, displaying, via the one or more display generation components, visual content corresponding to third content that is before the first content while continuing to output the first content and without outputting, via the one or more audio generation components, the third content, wherein the third content is different from the second content and the first content.

23. A computer system that is in communication with one or more input devices, one or more display generation components and one or more audio generation components, the computer system comprising:

one or more processors; and memory storing one or more programs configured to be executed by the one or more processors, the one or more programs including instructions for:

while outputting, via the one or more audio generation components, first content, detecting, via the one or more input devices, a first air gesture; and in response to detecting the first air gesture:

in accordance with a determination that the first air gesture is a first type of moving air gesture and that the first air gesture is in a first direction, displaying, via the one or more display generation components, visual content corresponding to second content that is next after the first content while continuing to output the first content and without outputting, via the one or more audio generation components, the second content, wherein the second content is different from the first content; and in accordance with a determination that the first air gesture is the first type of moving air gesture and that the first air gesture is in a second direction, displaying, via the one or more display generation components, visual content corresponding to third content that is before the first content while continuing to output the first content and without outputting, via the one or more output devices, the third content, wherein the third content is different from the second content and the first content.

* * * * *